(12) United States Patent
Itoh

(10) Patent No.: US 8,308,307 B2
(45) Date of Patent: Nov. 13, 2012

(54) ILLUMINATOR AND PROJECTOR

(75) Inventor: Yoshitaka Itoh, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 345 days.

(21) Appl. No.: 12/543,232

(22) Filed: Aug. 18, 2009

(65) Prior Publication Data

US 2010/0053564 A1    Mar. 4, 2010

(30) Foreign Application Priority Data

Sep. 4, 2008  (JP) .................................. 2008-226979

(51) Int. Cl.
*G03B 21/20*  (2006.01)

(52) U.S. Cl. ................ 353/85; 353/37; 353/73; 353/84; 353/87; 353/94; 353/98; 353/119; 362/346; 313/114; 313/115

(58) Field of Classification Search .................... 353/20, 353/31, 32, 33, 73, 84, 87, 94, 97, 98, 119, 353/122; 362/32, 227, 228, 234, 235, 248, 362/255, 263, 297, 298, 346, 237, 240, 241, 362/243, 265; 313/113, 114
See application file for complete search history.

(56) References Cited

U.S. PATENT DOCUMENTS

| | | | | |
|---|---|---|---|---|
| 4,089,047 A * | 5/1978 | Luderitz | .................. | 362/297 |
| 5,526,237 A * | 6/1996 | Davenport et al. | .......... | 362/551 |
| 6,304,693 B1 * | 10/2001 | Buelow et al. | ................. | 385/31 |
| 6,471,358 B1 * | 10/2002 | Itoh et al. | .................. | 353/98 |
| 6,561,678 B2 * | 5/2003 | Loughrey | ................. | 362/282 |
| 6,563,255 B1 * | 5/2003 | Collins | .................. | 313/113 |
| 7,040,768 B2 * | 5/2006 | Fujisawa et al. | ............... | 353/99 |
| 7,213,944 B2 * | 5/2007 | Shimaoka et al. | ............ | 362/299 |
| 7,530,697 B2 * | 5/2009 | Sawai et al. | ................. | 353/94 |
| 7,744,249 B2 * | 6/2010 | Yamamoto et al. | .......... | 362/263 |
| 7,967,449 B2 * | 6/2011 | Onodera | .................. | 353/85 |
| 2002/0149750 A1 * | 10/2002 | Kane | ................. | 353/94 |
| 2005/0083494 A1 * | 4/2005 | Hashizume | ................. | 353/98 |
| 2005/0157504 A1 * | 7/2005 | Vanden Eynden | ............ | 362/346 |
| 2005/0179872 A1 * | 8/2005 | Akiyama | ................. | 353/31 |
| 2007/0013281 A1 * | 1/2007 | Miyasu et al. | ................. | 313/24 |
| 2007/0200473 A1 * | 8/2007 | Kyomoto et al. | ............ | 313/114 |
| 2008/0094460 A1 * | 4/2008 | Nakata et al. | ................. | 347/102 |
| 2009/0016065 A1 * | 1/2009 | Huang | ................. | 362/297 |

FOREIGN PATENT DOCUMENTS

| | | |
|---|---|---|
| CN | 1809785 A | 7/2006 |
| JP | A-6-265887 | 9/1994 |
| JP | A-2003-187604 | 7/2003 |

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

An illuminator includes: a first light source and a second light source that are disposed substantially symmetrically with respect to an illumination optical axis, wherein each of the first and second light sources includes an arc tube, a first reflector disposed to surround part of the entire space around the optical axis of the arc tube, the first reflector reflecting the light emitted from the arc tube toward an object to be illuminated, and a second reflector disposed on the opposite side of the optical axis of the arc tube to the first reflector, the second reflector reflecting the light emitted from the arc tube toward the first reflector.

14 Claims, 19 Drawing Sheets

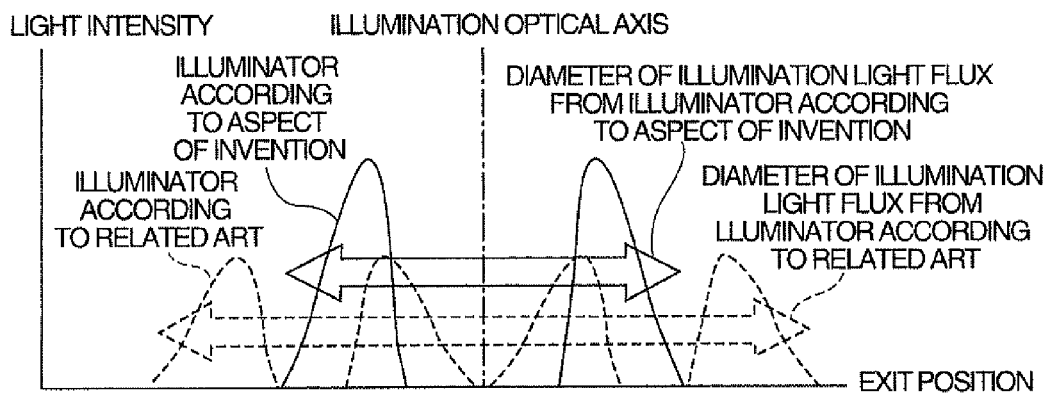
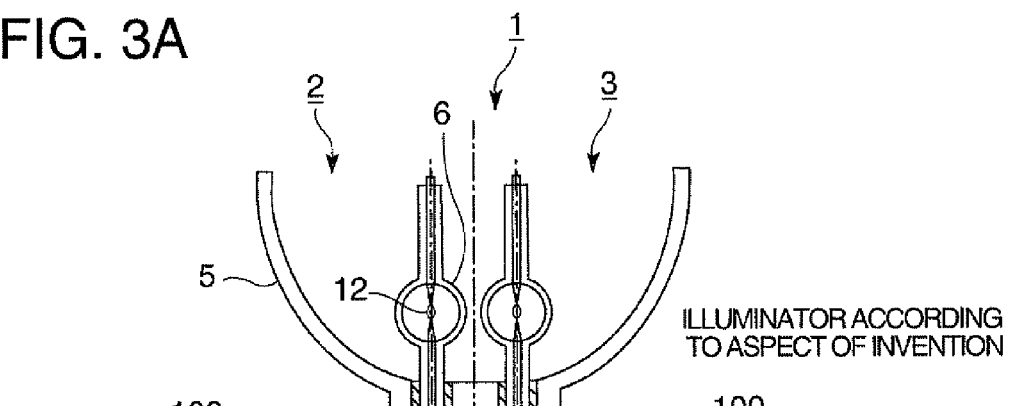
FIG. 3A
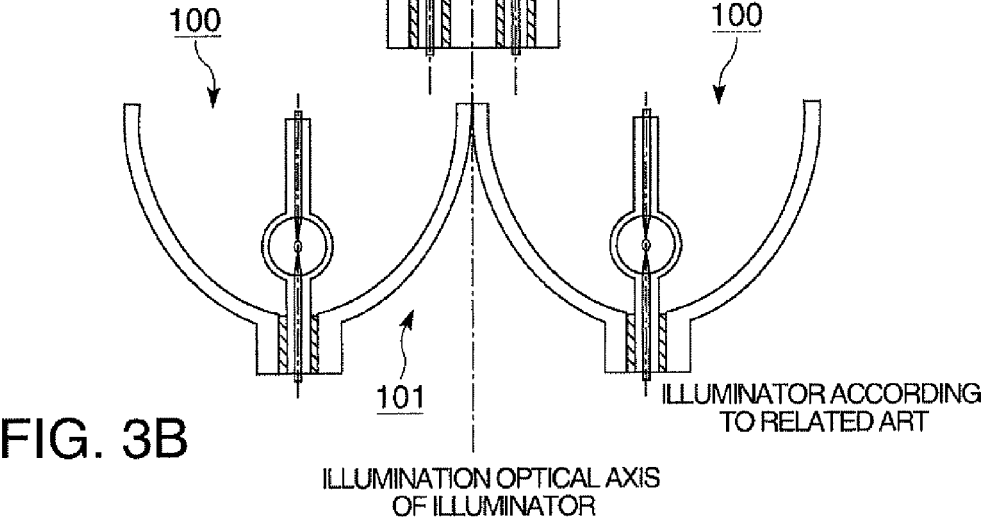
FIG. 3B

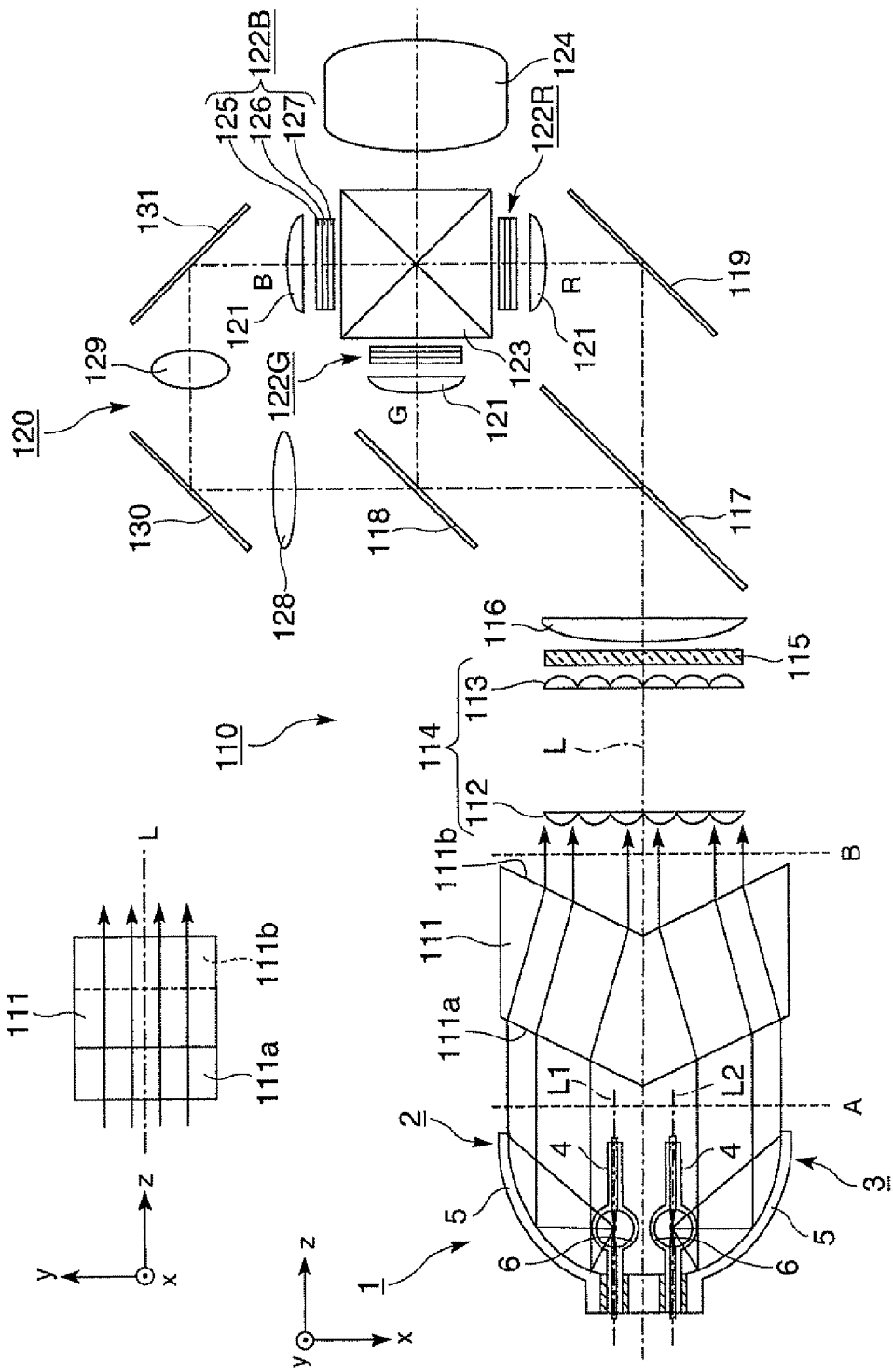

ILLUMINATOR AND PROJECTOR

BACKGROUND

1. Technical Field

The present invention relates to an illuminator that illuminates, for example, a light modulator and a projector in which a projection lens projects an optical image formed on the light modulator onto a screen, and more particularly to the configuration of an illuminator including a plurality of light sources.

2. Related Art

As an apparatus capable of displaying a large-screen image, there is a commercially available projector in which light from an illuminator illuminates a small light modulator that forms an optical image in accordance with image information and a projection lens enlarges and displays the optical image on a screen or any other suitable surface. In projectors of this type, increase in the size and brightness of projected images and reduction in uneven brightness and color are strongly desired. High-performance illuminators that achieve the desire have been developed.

An illuminator of a typical projector is configured in such a way that a substantially central portion of the light emitter in an arc tube coincides with the focal position of a reflector (concave reflection mirror) and the light emitted from the arc tube is reflected off the reflector and outputted in substantially one direction along an illumination optical axis. The light emitted from the arc tube is radiated in nearly all radial directions except the direction in which the light is blocked by electrodes and other components of the arc tube. Therefore, a reflector having a large opening diameter and a short focal length, what is called a deep reflector, is suitable to output the light from the arc tube in substantially one direction without loss of light. However, a large opening diameter leads to a large illuminator, which is against recent market needs in which smaller apparatus are desired. Further, an effort to shorten the focal length is limited because the reflector should not physically interfere with the arc tube and the heat generated in the arc tube should not damage the reflector. There are other problems: For example, when the focal length of the reflector is shortened, the curvature of the reflection surface having a concave shape changes greatly, which makes it difficult to form a high-reflectance reflection layer on the inner surface of the reflector. Therefore, in an illuminator using a single arc tube, an effort to increase the amount of exiting light (optical output) and reduce the size of the apparatus at the same time is limited.

To further increase the optical output, an illuminator including a plurality of arc tubes has been proposed.

For example, in a projection-type display apparatus (projector) disclosed in JP-A-6-265887, unevenness in brightness and color of illumination light is reduced by using two light sources (each of which includes an arc tube and a reflector) disposed side by side to increase the amount of light that illuminates a light valve (light modulator) and providing an optical integration system corresponding to each of the light sources.

On the other hand, to reduce the size of the apparatus, JP-A-2003-187604 discloses an illuminator including a reflector having a shape obtained by halving a typical reflector along a plane including an illumination optical axis (hereinafter referred to as "halved") and a spherical reflector that corresponds to the halved reflector and is disposed in the vicinity of an arc tube.

Optical characteristics of an optical device, such as a light modulator represented by a liquid crystal light valve, a polarization device, and a projection lens, depend on the angle at which light is incident on the optical device. Therefore, to improve the quality of displayed images, it is desirable that an illuminator can output illumination light distributed within a narrow angular range. However, according to the configuration of the projector described in JP-A-6-265887, since the two light sources (arc tubes) are disposed in positions significantly spaced apart from the illumination optical axis, the spatial and angular distributions of the illumination light widely spread. Further, two groups of light source images formed in the pupil plane of a projection lens are formed in positions spaced apart from the projection optical axis.

As a result, when a dichroic mirror, the color light separation characteristic of which depends on the angle of incidence, is used as a color light separation system, the separated color light fluxes have unevenness in color in a cross-section thereof. A displayed image therefore experiences unevenness in color and reduction in contrast. Further, the brightness of a displayed image cannot be increased as expected. Moreover, since the imaging performance of the projection lens is high in the vicinity of the projection optical axis whereas decreasing with distance from the projection optical axis, the projection lens cannot fully show its imaging performance, disadvantageously resulting in, for example, degradation in quality of the displayed image.

On the other hand, when the illuminator disclosed in JP-A-2003-187604 is used as a coaxial illumination system of a projector, the angular distribution of the light having exited from the illuminator does not have axial symmetry. Therefore, when the component to be illuminated is a liquid crystal light valve or any other light modulator the display characteristics of which depends on the angle at which light is incident on the light modulator, the asymmetry of the angular distribution of the illumination light results in significant unevenness in illuminance and color, which significantly degrades the quality of displayed images.

SUMMARY

From the viewpoint of improving illumination efficiency, increasing the brightness of displayed images, and improving image quality, an advantage of some aspects of the invention is to achieve an illuminator that efficiently outputs the light emitted from an arc tube in substantially one direction, provides illumination light that has narrow spatial and angular distributions, provides illumination light that is very bright and excels in the symmetry of the intensity distribution, and can be readily reduced in size. Another advantage of some aspects of the invention is to achieve a projector including the illuminator described above.

An illuminator of a first aspect of the invention includes a first light source and a second light source that are disposed substantially symmetrically with respect to an illumination optical axis, and each of the first and second light sources includes an arc tube, a first reflector disposed to surround part of the entire space around the optical axis of the arc tube, the first reflector reflecting the light emitted from the arc tube toward an object to be illuminated, and a second reflector disposed on the opposite side of the optical axis of the arc tube to the first reflector, the second reflector reflecting the light emitted from the arc tube toward the first reflector.

The "illumination optical axis" used herein is the optical axis of the entire illuminator. The "optical axis of the arc tube" is an axis that passes through the light emitter produced in the arc tube when power is being supplied and is substantially an axis of symmetry in the light emission distribution of the arc tube.

Since the illuminator of the first aspect of the invention includes two light sources, the first and second light sources, each of which includes the arc tube, the first reflector, and the second reflector, the illumination light provided from the illuminator has brightness higher than that obtained in an illuminator including only one arc tube. Further, since two light sources having the same configuration are disposed substantially symmetrically with respect to the illumination optical axis, the illumination light provided from the illuminator has an excellently symmetric intensity distribution. Moreover, since the light emitted from each of the arc tubes in the direction away from the first reflector is reflected off the second reflector toward the first reflector and then reflected off the first reflector toward the object to be illuminated, the light emitted from the arc tube can exit in substantially one direction along the illumination optical axis without loss of light.

Each of the first reflectors according to the first aspect of the invention having a function of reflecting light toward an object to be illuminated, like a reflector of related art, is disposed to surround part of the entire space around the optical axis of the corresponding arc tube when viewed along the optical axis of the arc tube. That is, since each of the first reflectors according to the first aspect of the invention, unlike the reflector described in JP-A-6-265887, does not surround the entire space around the optical axis of the corresponding arc tube, the reflectors do not interfere with each other and the two arc tubes can be disposed close to each other. As a result, the light fluxes emitted from the two arc tubes can be located in the vicinity of the illumination optical axis, whereby the illumination light provided from the illuminator has narrow spatial and angular distributions and the illuminator can be reduced in size.

In the illuminator according to the aspect of the invention, it is desirable that each set of the first and second reflectors is disposed in such a way that curved reflection surfaces thereof face each other and at least one of the first and second reflectors is disposed to surround nearly the entire space around the optical axis of the corresponding arc tube. The first and second reflectors are disposed in such a way that the focal positions of the reflectors coincide with a substantially central portion of the light emitter in an arc tube.

According to the above configuration, the amount of light emitted from each of the arc tubes in substantially all radial directions but lost because reflected off neither the first reflector nor the second reflector (the light that does not exit in substantially one direction along the illumination optical axis) can be reduced, and most of the light emitted from the arc tube can be effectively used as the light illuminating an object to be illuminated.

In the illuminator according to the aspect of the invention, when the light emitter is a perfect point (point light source), and the light receivable angular range of each of the first and second reflectors is 180 degrees, each set of the first and second reflectors can cover the entire space (360 degrees) around the optical axis of the corresponding arc tube. Alternatively, the light receivable angular range of the first reflector around the optical axis of the corresponding arc tube may be greater than 180 degrees.

It is assumed in the above description that the light emitter is a perfect point (point light source). However, an actual light emitter is not a perfect point (point light source) but has a linear shape having a finite size or a three-dimensional shape taking up a fixed space. When the light emitter has a finite size, there is light radiated from positions spaced apart from the focal positions of the two reflectors. According to the above configuration, the amount of light reflected off neither the first reflector nor the second reflector can be reduced, and the amount of light exiting in substantially one direction along the illumination optical axis can be increased accordingly. Further, since a neck portion (fixing portion) of the first reflector in each of the light sources can be increased in area, the corresponding arc tube can be fixed more reliably.

In the illuminator according to the aspect of the invention, not only may the light receivable angular range of each of the first reflectors be greater than 180 degrees, but also the light receivable angular range of the corresponding second reflector around the optical axis of the corresponding arc tube may be greater than 180 degrees.

Since the above configuration allows the light radiated from positions spaced apart from the focal positions of the reflectors to be reliably reflected off one of the reflectors, the amount of light exiting in substantially one direction along the illumination optical axis can be further increased.

In the illuminator according to the aspect of the invention, each of the second reflectors can be formed of a reflection layer formed on the surface of the corresponding arc tube.

The above configuration eliminates the need for a support member for supporting the second reflector and hence the adjustment of the position where the second reflector is attached. Further, the illuminator is readily reduced in size.

Alternatively, each of the second reflectors can be formed of a reflection mirror that is a separate component from the corresponding arc tube and disposed in the vicinity thereof.

The above configuration allows the optical characteristics of the reflection mirror (the shape and the curvature of a concave surface, for example) to be appropriately set and the position where the reflection mirror is attached to be adjusted in consideration of, for example, a lens effect of a spherical bulb that forms the arc tube. In this way, the light reflected from the reflection mirror readily returns to a desired position, and the light usage efficiency is readily increased. Further, since the reflected light will not impinge on the electrodes in the arc tube by adjusting the position where the reflection mirror is attached, the life of the arc tube is effectively prolonged. Moreover, since the reflection mirror can be disposed in a position spaced apart from the bulb so that there is a gap between the reflection mirror and the bulb, which becomes hot during the operation, the heat will not degrade the reflection mirror and the optical characteristics and the accuracy in the attachment position are readily maintained.

For example, to ensure heat resistance by using the same coefficient of thermal expansion, the base of the reflection mirror is desirably made of the same material (quartz glass, for example) as that of the arc tube. On the other hand, the reflection layer is desirably formed of a dielectric multilayer film or a metallic film.

In the illuminator according to the aspect of the invention, the first reflector in the first light source and the first reflector in the second light source may be integrated with each other.

According to the above configuration, the optical axes of the arc tubes in the two light sources are readily aligned. Further, the number of parts and hence the cost are reduced.

In the illuminator according to the aspect of the invention, a separation plate may be provided between the first light source and the second light source, the separation plate partitioning the space in which the arc tubes of the first and second light sources are disposed.

According to the above configuration, the separation plate partitions the space in which the arc tubes are disposed. Therefore, for example, if the arc tube in one of the first and second light sources is broken, the other light source is not affected.

Further, the separation plate may be formed of two separation plates, a first separation plate located in the first light source and a second separation plate located in the second light source.

According to the above configuration, since the interface between the first separation plate and the second separation plate makes the first light source and the second light source independent of each other, each of the light sources is readily attached and detached on a light source basis. Therefore, for example, if either the first light source or the second light source fails to emit light, the failed light source can be readily exchanged.

In the illuminator according to the aspect of the invention, it is desirable that a first lead wire connected to the arc tube in the first light source and a second lead wire connected to the arc tube in the second light source are disposed in such a way that the lead wires are spaced apart from each other.

According to the above configuration, the first and second lead wires unlikely block the light having exited from the first and second light sources, and the influence of heat on the lead wires is reduced. Further, the influence of electromagnetic waves produced when a high-voltage current is conducted through the lead wires can be reduced, whereby a stable lamp operation is achieved.

The illuminator according to the aspect of the invention may further include a light path changer for causing the light fluxes having exited from the first and second light sources to approach the illumination optical axis.

According to the above configuration, the spatial and angular distributions of the illumination light can be narrowed and the illumination efficiency can be improved accordingly. Further, the light path changer may be integrated with the reflectors, in which case the illuminator can be further reduced in size.

The illuminator according to the aspect of the invention may further include an illuminance homogenizing system for homogenizing the illuminance of the light fluxes having exited from the first and second light sources, the illuminance homogenizing system having a function of causing the light fluxes having exited from the first and second light sources to approach the illumination optical axis.

According to the above configuration, in the illuminator including the illuminance homogenizing system, the spatial and angular distributions of the illumination light can be narrowed and the illumination efficiency can be improved accordingly without adding any light path changing optical component.

A projector according to a second aspect of the invention includes the illuminator the first aspect of the invention, a light modulator that modulates the light from the illuminator, and a projection system that projects the light modulated by the light modulator.

The projector according to the second aspect of the invention including the illuminator according to the first aspect of the invention can improve the illumination efficiency, increase the brightness of a displayed image, and improve the quality thereof.

In the projector according to the aspect of the invention, it is desirable that the first and second light sources in the illuminator are disposed side by side along the longer side of the light modulator.

In the illuminator according to the first aspect of the invention, the light intensity of the illumination light that exits from an area in the vicinity of the area where the first and second light sources are disposed adjacent to each other may be lower than those in the other areas, and the symmetry of the light intensity tends to deteriorate in this portion. In this respect, according to the configuration in which the first and second light sources are disposed side by side along the longer side of the light modulator, the area where the first and second light sources are disposed adjacent to each other is positioned along the shorter side of the light modulator, whereby the adverse effect on the image quality, that is, reduction in image quality, can be reduced.

In the projector according to the aspect of the invention, when the projector includes a color light separation system that separates the light fluxes having exited from the first and second light sources into a plurality of color light fluxes having different wavelength ranges, it is desirable that the first and second light sources are disposed side by side along the direction perpendicular to the direction in which the color light separation system performs color light separation.

As described above, the light intensity of the illumination light that exits from an area in the vicinity of the area where the two light sources are disposed adjacent to each other may be lower than those in the other areas. In this case, unevenness in color and brightness can be reduced by placing the light described above in the direction in which the incident angle dependence of the color light separation system is large.

BRIEF DESCRIPTION OF THE DRAWINGS

The invention will now be described with reference to the accompanying drawings, wherein like numbers reference like elements.

FIG. 1A is a side cross-sectional view and FIG. 1B is a front view.

FIG. 2A shows the path of light reflected off each reflector and FIG. 2B shows the result of comparison of the light intensity distribution of the light from the present illuminator with that of the light from an illuminator of a comparative example.

FIGS. 3A and 3B show the result of comparison of the light intensity distribution of the light from the present illuminator with that of the light from an illuminator of related art.

FIG. 6A is a side cross-sectional view and FIG. 6B is a front view.

FIG. 9A is a side cross-sectional view and FIG. 9B is a front view.

FIG. 10A is a side cross-sectional view and FIG. 10B is a front view.

FIG. 11A is a side cross-sectional view and FIG. 11 is a front view.

FIG. 12A is a side cross-sectional view and FIG. 12B is a front view.

FIG. 13A is a schematic configuration diagram of a projector of a fifth embodiment of the invention, and FIG. 13B shows a light path changing optical device when viewed from a direction different from the direction in which the light path changing optical device is viewed in FIG. 13A.

DESCRIPTION OF EXEMPLARY EMBODIMENTS

First Embodiment

Embodiments of the invention will be described below with reference to figures. It is noted that the components in the following drawings may not be drawn to scale for clarity of the components.

A first embodiment of the invention will be described below with reference to FIGS. 1A and 1B to 3A and 3B.

The present embodiment is an example of the illuminator according to an aspect of the invention including two light sources.

Figure 1A:
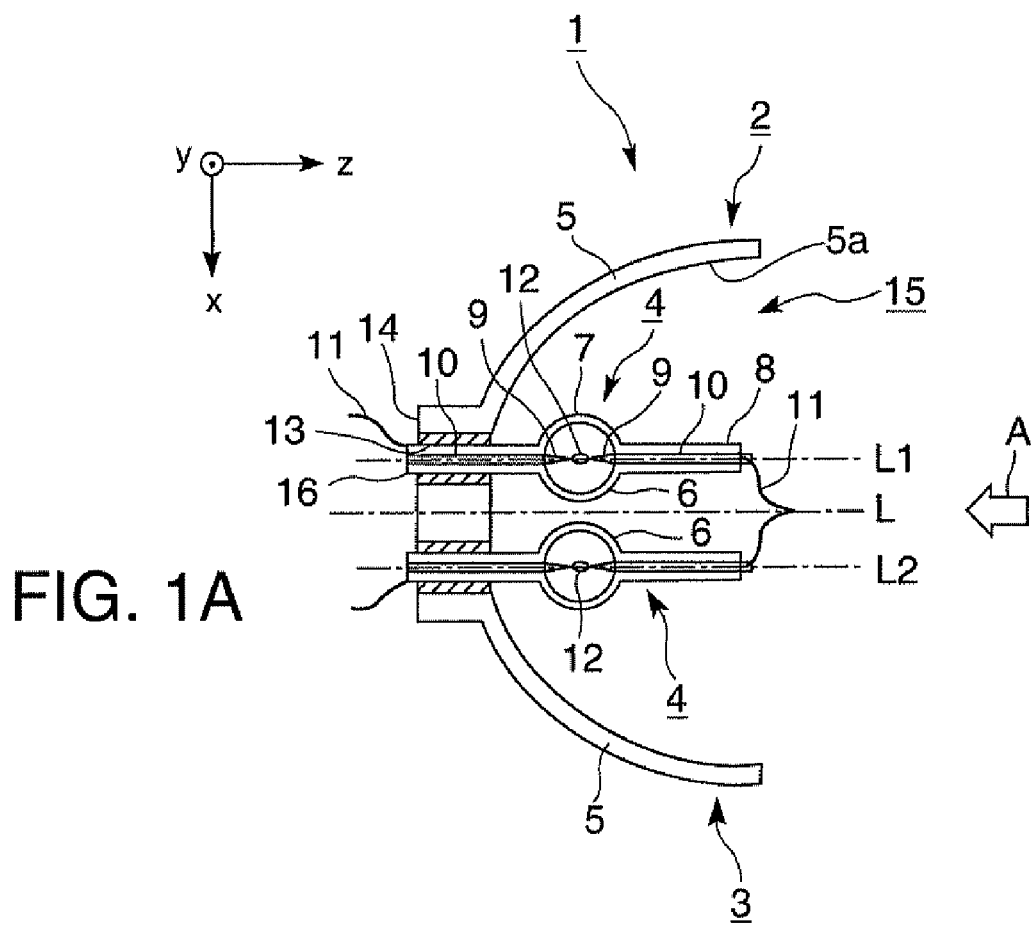
FIGS. 1A and 1B show the configuration of an illuminator of a first embodiment of the invention.
Figure 1B:
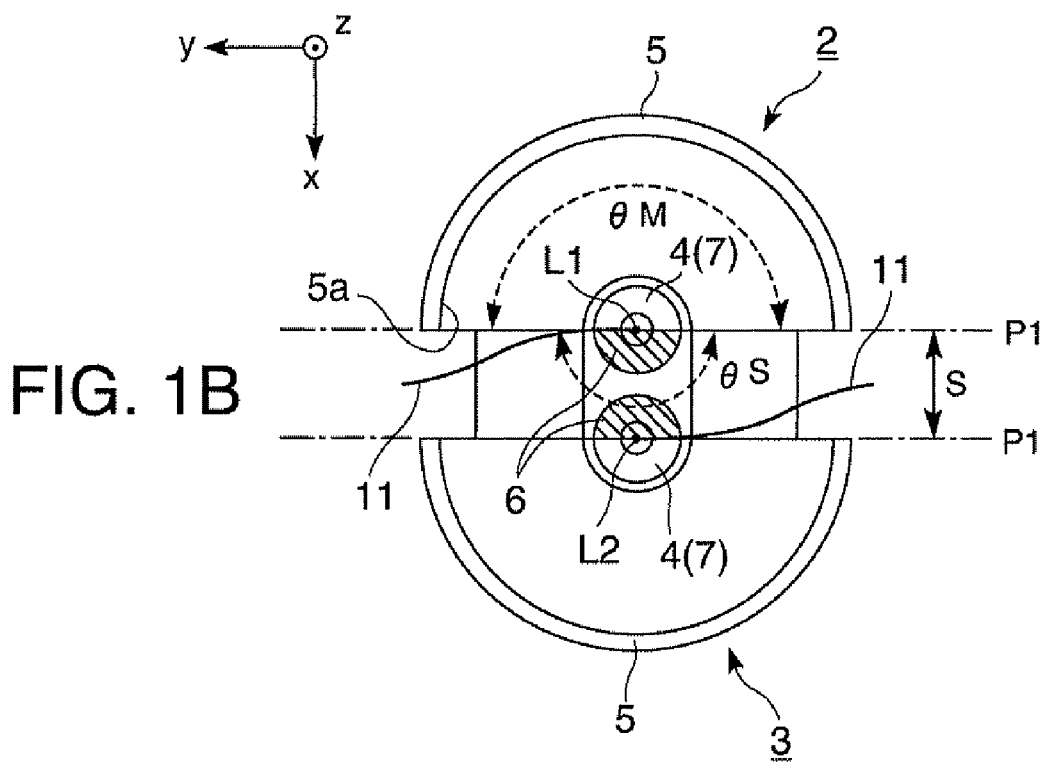

FIGS. 1A and 1B show the configuration of the illuminator of the present embodiment. FIG. 1A is a side cross-sectional view taken along a plane including an illumination optical axis and two light emitters, which will be described later. FIG. 1B is a front view of the illuminator when viewed from the direction in which the illumination optical axis extends (the direction indicated by the arrow A in FIG. 1A).

Figures 2A, 2B:
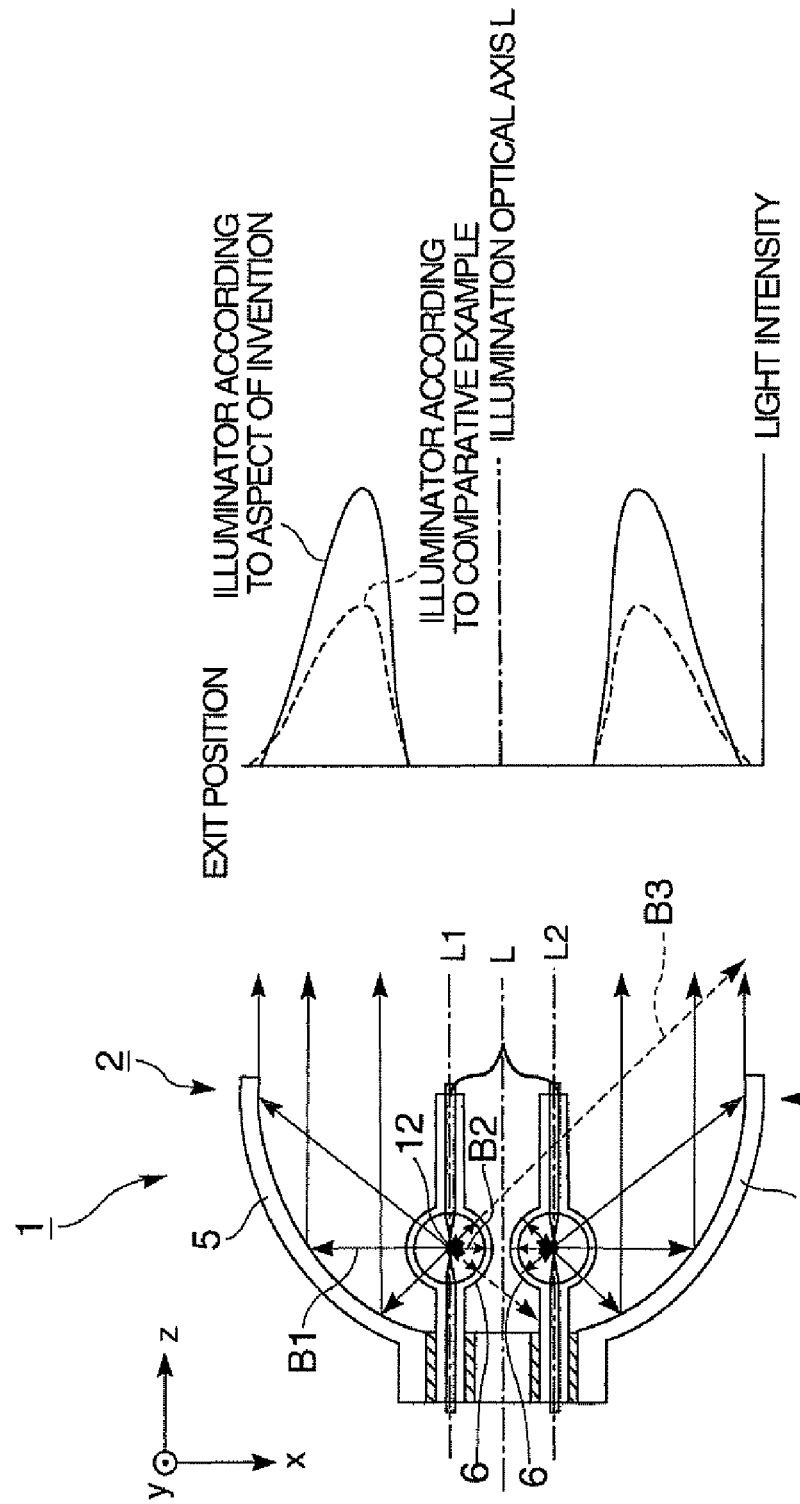
FIGS. 2A and 2B show an advantageous effect of a sub-reflector in the present illuminator.

FIGS. 2A and 2B show an advantageous effect achieved by providing a sub-reflector. FIG. 2A shows the path of light reflected off each reflector. FIG. 2B shows the result of comparison of the light intensity distribution of the exiting light flux from the illuminator of the present embodiment with that of the exiting light flux from an illuminator of a comparative example.

FIGS. 3A and 3B show the result of comparison of the light intensity distribution of the exiting light flux from the illuminator of the present embodiment with that of the exiting light flux from an illuminator of related art.

In the following description, the optical axis of the entire illuminator is referred to as an "illumination optical axis L," and the optical axes of main reflectors in first and second light sources are referred to as a "lamp optical axis L1" and a "lamp optical axis L2," respectively. Since the light emitter in an arc tube is disposed in the focal position of the corresponding main reflector, as will be described later, the "lamp optical axis" coincides with the "optical axis of the arc tube." The "optical axis of the arc tube" is an axis that passes through the light emitter and is substantially an axis of symmetry in the light emission distribution of the arc tube. In the present embodiment, an arc tube having a pair of electrodes is used, and the "optical axis of the arc tube" coincides with the direction in which the pair of electrodes extends.

The illuminator 1 of the present embodiment includes two light sources, a first light source 2 and a second light source 3, disposed symmetrically with respect to the illumination optical axis L, as shown in FIGS. 1A and 1B. The first light source 2 and the second light source 3 have the same structure including an arc discharge-type arc tube 4 (hereinafter sometimes simply referred to as an "arc tube"), a main reflector 5 (first reflector), and a sub-reflector 6 (second reflector). The main reflector 5 is primarily responsible for reflecting the light emitted from the arc tube 4 toward an object to be illuminated. The sub-reflector 6 is primarily responsible for reflecting the light emitted from the arc tube 4 toward the main reflector 5.

The arc tube 4 includes a bulb 7, sealing portions 8, a pair of electrodes 9 and feeding terminals 10, and lead wires 11, as shown in FIG. 5A. The bulb 7 is a substantially spherical member having an internal space therein, and the stick-shaped sealing portions 8 are integrally formed with the bulb 7 at both ends thereof. The bulb 7 and the sealing portions 8 are made of a transparent material having high heat resistance, such as quartz glass and sapphire. In the internal space of the bulb 7, the pair of pointed electrodes 9 are disposed in such a way that they face each other, and a light-emitting substance and a gas are sealed. Examples of the light-emitting substance include mercury and metallic halides, and examples of the gas include rare gases and halogen gases. In the present embodiment, the arc tube 4 is fixed to the corresponding main reflector 5 in such a way that the direction in which the pair of electrodes 9 extends coincides with the lamp optical axes L1 (L2).

The feeding terminals 10 extending from the pair of electrodes 9 pass through the respective sealing portions 8. One of the feeding terminals 10 is connected to one of the lead wires 11, and the other one of the feeding terminals 10 is connected to a base cap 16. The base cap 16 is connected to the other one of the lead wires 11. In this configuration, electric power is externally supplied to the electrodes 9 via the lead wires 11 and the base cap 16. The lead wires 11 in the first light source 2 (first lead wires) and the lead wires 11 in the second light source 3 (second lead wires) are disposed in such a way that the first and second lead wires 11 extend away from each other, as shown in FIG. 1B. In the thus configured arc tube 4, when a high voltage is applied between the pair of the electrodes 9, discharge occurs between the electrodes 9 and a linear or point light emitter 12 is produced. The light emitter 12 emits light in nearly all radial directions. Examples of the arc discharge-type arc tube 4 include a high-pressure mercury lamp, a metal-halide lamp, and a xenon lamp.

Each of the main reflectors 5 includes a base made of glass, crystalline glass, or any other material having high heat resistance and high mechanical strength and a reflection mirror formed of, for example, a dielectric multilayer film or a metallic film formed all over the inner surface of the base (the surface that faces the arc tube). The main reflector 5 further includes a neck portion 14 having a rear through hole 13 for inserting and fixing the corresponding sealing portion 8 of the arc tube 4 and a front opening 15 through which light exits toward an object to be illuminated. As shown in FIG. 1A, a reflection surface 5a on which the reflection mirror of the main reflector 5 is formed is a parabolic surface. The reflection surface 5a is not limited to a parabolic surface but may be an ellipsoidal surface or an aspheric surface.

When taken along a plane perpendicular to the lamp optical axes L1 and L2, a typical reflector has a reflection mirror disposed all around (in 360 degrees) the lamp optical axis L1 (L2), whereas the main reflector 5 of the present embodiment has the reflection surface 5a, on which the reflection mirror is formed, disposed halfway around (in 180 degrees) the lamp optical axis, as shown in FIG. 1B. The angular range of the inner surface of the main reflector 5 within which the reflection mirror is present and the light from the corresponding arc tube 4 and sub-reflector 6 can be received is referred to as a "light receivable angular range θM of the main reflector 5." In other words, when taken along a plane perpendicular to the lamp optical axes L1 and L2, the light receivable angular range θM is the angle between two line segments, one of which connects one end of the reflection mirror to the lamp optical axis L1 (L2) and the other one of which connects the other end of the reflection mirror to the lamp optical axis L1 (L2). In this example, θM=180°. That is, the main reflector 5 of the present embodiment has a shape obtained by halving a typical reflector that covers the entire space around the lamp optical axis L1 (L2) (in 360 degrees) along a plane P1 including both ends of the reflection mirror and the lamp optical axis L1 (L2) (what is called a halved shape).

The main reflector 5 is disposed in such a way that the optical axis of the main reflector 5 (reflection mirror) coincides with the optical axis of the corresponding arc tube 4 (the direction in which the pair of electrodes extends). That is, the main reflector 5 is aligned with the arc tube 4 in such a way that the focal position of the main reflector 5 coincides with the position of the light emitter 12. In the present embodiment, the optical axis of the main reflector 5 (reflection mirror) and the optical axis of the arc tube 4, which coincide with each other, are the lamp optical axes L1 (L2), as described above.

Each of the sub-reflectors 6 is formed of a reflection layer formed on an area that is one-half the outer surface of the bulb 7 of the arc tube 4 and located on the opposite side of the lamp optical axis L1 (L2) to the main reflector 5. That is, the sub-reflector 6 is provided in an area that is part of the outer surface of the bulb 7 and obtained by halving the bulb 7 along the plane P1 including the lamp optical axis L1 (L2) (the hatched portion in FIG. 1B), as shown in FIG. 1B. As in the case of the main reflector 5, the angular range of the sub-reflector 6 within which the reflection layer is present and the light from the corresponding arc tube 4 can be received is defined as a "light receivable angular range θS," and θS=180°.

Since the reflection layer that forms the sub-reflector 6 requires high heat resistance, the reflection layer is preferably formed of, for example, a multilayer film made of tantalum pentoxide ($Ta_2O_5$) and silicon oxide ($SiO_2$) or a multilayer film made of titanium oxide ($TiO_2$) and silicon oxide ($SiO_2$). Alternatively, using a multilayer film containing niobium pentoxide ($Nb_2O_5$) advantageously improves light emission efficiency because ultraviolet light emitted from the light emitter 12 is absorbed and the temperature of the bulb 7 can be maintained.

The illuminator 1 of the present embodiment is configured in such a way that the first light source 2 and the second light source 3, which have the same configuration including the components described above, are disposed symmetrically with respect to the illumination optical axis L, as shown in FIG. 1A. The first light source 2 and the second light source 3 are disposed in such a way that the lamp optical axis L1 of the first light source 2 and the lamp optical axis L2 of the second light source 3 are substantially parallel to the illumination optical axis L and the distance between the lamp optical axes L1 and L2 is minimized. In the present embodiment, there is a gap S between the main reflector 5 of the first light source 2 and the main reflector 5 of the second light source 3, as shown in FIG. 1B. The dimension of the gap S (the distance between P1 and P1) is slightly greater than the diameter of the bulb 7.

In the thus configured illuminator 1, the light emitters 12 emit light in nearly all radial directions, as shown in FIG. 2A. Light fluxes B1 radiated toward the main reflectors 5 are reflected off the reflection mirrors of the main reflectors 5, and the reflected light fluxes substantially parallel to the lamp optical axes L1 and L2 exit from the first light source 2 and the second light source 3, as shown in FIG. 2A. On the other hand, since the reflection layer that forms each of the sub-reflectors 6 is formed on the outer surface of the corresponding one of the substantially spherical bulbs 7, the reflection surface of the reflection layer has a spherically curved shape. Therefore, light fluxes B2 radiated toward the sub-reflectors 6 are reflected off the reflection layers, pass the light emitters 12 in the form of convergent light, travel toward the main reflectors 5 as if the light fluxes were emitted from the light emitters 12, and are reflected off the reflection mirrors of the main reflectors 5. The reflected light fluxes substantially parallel to the lamp optical axes L1 and L2 exit from the first light source 2 and the second light source 3. That is, the reflection mirror of each of the main reflectors 5 has a function of not only directly receiving the light emitted from the corresponding light emitter 12 and reflecting it toward an object to be illuminated but also receiving the light reflected off the reflection layer that forms the corresponding sub-reflector 6 and reflecting it toward the object to be illuminated.

FIG. 2B shows the result of comparison of the light intensity distribution of the exiting light flux in the illuminator 1 of the present embodiment with the light intensity distribution of the exiting light flux in an illuminator of a comparative example. It is assumed that the "illuminator of a comparative example" used herein includes a halved main reflector similar to that in the present embodiment but no sub-reflector. As shown in FIG. 2B, in a plane perpendicular to the lamp optical axes L1 and L2, the light intensity peaks at the middle between the lamp optical axes L1, L2 and the ends of the respective main reflectors 5. The light intensity is zero in the area between the lamp optical axis L1 and the lamp optical axis L2 and areas in the vicinity of the area, that is, no light exits from these areas.

Since the illuminator of the comparative example includes no sub-reflector, most of light fluxes B3 emitted from one of the light emitters 12 shown in FIG. 2A toward the main reflector 5 that does not correspond to that light emitter 12 (but corresponds to the adjacent light emitter) does not exit forward along the illumination optical axis L. The reason for this is that the light emitter 12 is significantly spaced apart from the focal position of the adjacent main reflector. Since the amount of light exiting from the illuminator of the comparative example is determined only by the light directly radiated toward the main reflector 5 corresponding to the light emitter 12, the amount of exiting light is approximately 50% of the total amount of light emitted from the light emitter 12 at maximum. In contrast, since the illuminator 1 of the present embodiment can output the light reflected off the sub-reflectors 6 via the main reflectors 5, the amount of exiting light can be greater than that in the comparative example by a factor ranging from approximately 1.8 to 2.

FIGS. 3A and 3B show the result of comparison of the light intensity distribution of the exiting light flux in the illuminator 1 of the present embodiment with the light intensity distribution of the exiting light flux in an illuminator of related art. It is assumed that the "illuminator of related art" used herein is an illuminator 101 including two light sources 100 disposed side by side, each of which including a typical reflector, for example, the illuminator shown in FIG. 1 in JP-A-6-265887. FIGS. 3A and 3B are drawn by setting the positional relationship between the upper portion (FIG. 3A) and the lower portion (FIG. 3B) in such a way that the exit positions on the horizontal axis of the upper light intensity distribution diagram (FIG. 3A) substantially correspond to the positions of the illuminators 1 and 101 in the lower portion (FIG. 3B).

As seen from FIGS. 3A and 3B, the illuminator 1 of the present embodiment, in which the light emitters 12 can be more closely disposed than in the illuminator 101 of related art, can provide illumination light having a smaller light flux diameter. In general, the illumination efficiency (light collection efficiency) in an illumination system increases as the light flux diameter of the illumination light decreases, provided that the angular distribution remains the same. This fact indicates that the illumination light provided by the illuminator 1 of the present embodiment is more readily used in the following optical system than that provided by the illuminator 101 of related art.

The bulb 7 of each of the arc tubes 4 desirably has a completely spherical shape at least in the area where the reflection layer is formed. More accurately, it is desirable that the inner surface (on the electrode side) and the outer surface of the bulb 7 are spherical and the centers of curvature of the two surfaces coincide with each other. The light emitter 12 is desirably located at the focal position of the reflection layer. The reason for this is that the above conditions allow the reflection layer to focus the light emitted from the light emitter 12, which can be ideally considered as a point, into a point again formed at the light emitter 12. The shape described above allows the light to impinge on the tube surface (quartz glass surface) of the bulb 7 at right angles, whereby the amount of light reflection on the tube surface of the bulb 7 can be reduced and the amount of light radiated from the bulb 7 can be increased accordingly. When the bulb 7 is precisely shaped, the manufacturing process thereof is readily carried out because it is not necessary to adjust the position where the sub-reflector 6 as the reflection layer is formed.

However, considering that the actual light emitter 12 is not an ideal point but has a linear shape having a finite size or a three-dimensional shape taking up a fixed space, the bulb does not necessarily have a spherical shape but may be a spheroidal shape symmetric with respect to the lamp optical axes L1 (L2) (In this case, it is also desirable that the centers of curvature of the inner and outer surfaces coincide with each other). The shape described above allows the light reflected off the reflection layer to efficiently return to the light emitter 12, whereby the amount of light traveling via the reflection layer to the corresponding main reflector 5 can be effectively increased.

Since the illuminator 1 of the present embodiment includes the halved main reflectors 5 and the sub-reflectors 6, which reflect light toward the main reflectors 5, the apparatus can be significantly smaller than the illuminator of related art having two light sources, each of which including a typical reflector, disposed side by side without decreasing most amount of light emitted from the arc tubes 4. Further, in the present embodiment, using the reflection layer, which is formed on the outer surface of the bulb 7 of each of the arc tubes 4, as the sub-reflector 6 contributes to the reduction in the size of the light source and hence the illuminator.

In any of the optical devices used in a projector or other similar apparatus, such as a liquid crystal light valve, a micro mirror array device, and a projection lens, the display performance thereof depends on the angle at which light is incident thereon. Therefore, to increase the illumination efficiency, it is important to increase the amount of highly parallelized illumination light that the illuminator can output. That is, it is important that the illuminator can produce illumination light having an intensity distribution that contains a greater amount of light flux on the illumination optical axis L or in portions that are in the vicinity thereof and disposed symmetrically with respect thereto. In this respect, as having been described with reference to FIGS. 2A and 2B and FIGS. 3A and 3B, the illuminator 1 of the present embodiment produces an intense light flux in portions that are in the vicinity of the illumination optical axis L and disposed symmetrically with respect thereto without greatly reducing the amount of exiting light as compared to the illuminator of related art. Therefore, the illuminator 1 of the present embodiment can significantly increase the amount of exiting light per unit size of the illuminator and produce highly parallelized illumination light that can be used efficiently as compared to the illuminator of related art.

Further, in the illuminator 1 of the present embodiment, since the feeding lead wires 11 can be disposed in the space between the two main reflectors S where no exiting light is present, as shown in FIG. 1B, the lead wires 11 will not block the exiting light and hence the exiting light will not be lost. Moreover, since the heat generated by the exiting light hardly affect the lead wires 11, the reliability of the feeding portions of the arc tubes 4 can be enhanced. Further, since the two lead wires 11 are spaced apart from each other, the influence of electromagnetic waves produced when a high-voltage current is supplied to the lead wires 11 can be reduced, whereby a stable lamp operation is achieved.

Variation 1-1

Figure 4:
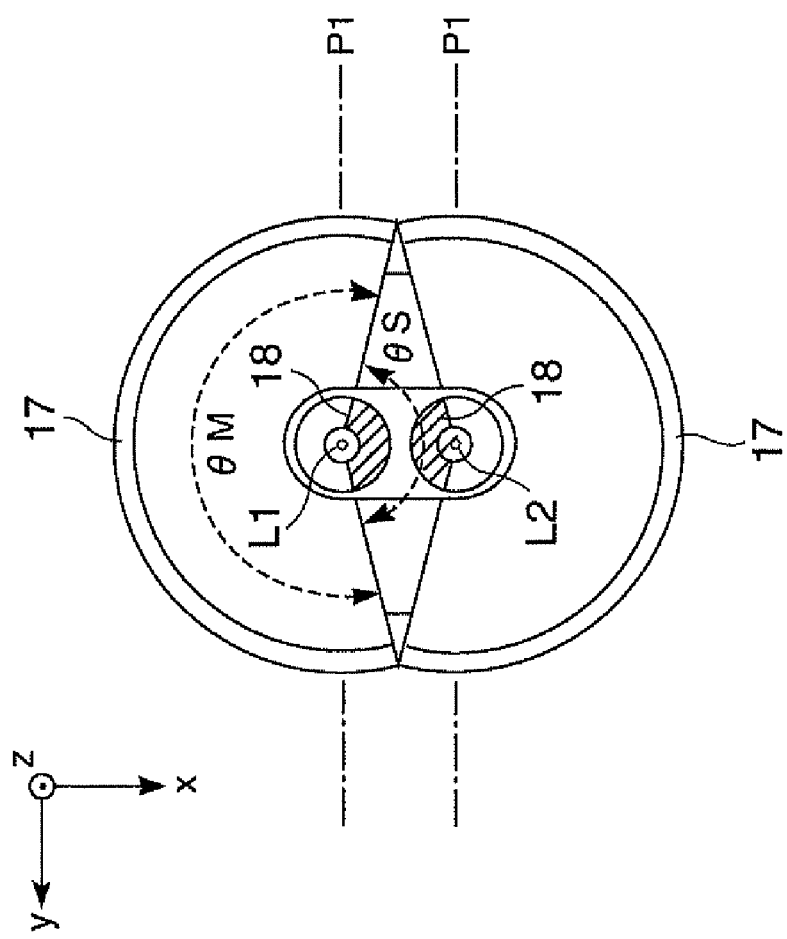
FIG. 4 is a front view of an illuminator of Variation 1-1.

In the embodiment described above, the main reflectors 5 and the sub-reflectors 6 are halved ($\theta M=\theta S=180°$), but they do not necessarily have perfectly halved shapes. For example, as shown in FIG. 4, the light receivable angular range $\theta M$ of each main reflector 17 may be greater than 180 degrees, and the light receivable angular range $\theta S$ of each sub-reflector 18 may be smaller than 180 degrees. In the configuration shown in FIG. 4, each of the main reflectors 17 is shaped in such a way that it slightly goes beyond the plane P1 including the lamp optical axis L1 (L2) and curve toward the corresponding sub-reflector 18. In this case, $\theta M>180°$. On the other hand, the reflection layer that forms the sub-reflector 18 is formed on an area smaller than the halved area in accordance with how much the main reflector 17 goes beyond the plane P1. In this case, $\theta S<180°$. That is, the main reflector and the sub-reflector may be configured in such a way that one of the reflectors can receive the light emitted from the light emitter in nearly all radial directions. The shape of the main reflector 17 that slightly overhangs and curves toward the sub-reflector 18 shown in FIG. 4 hardly increases the size of the illuminator. It is therefore desirable to set the degree of overhang of the main reflector 17 in such a way that the gap S, which is inevitably created by the presence of the bulb 7 between the main reflector 17 in the first light source 2 and the main reflector 17 in the second light source 3, does not increase. Forming the neck portion of the main reflector 17 into a substantially tubular shape or a "C" shape increases the portion that holds the corresponding sealing portion 8 of each of the arc tubes 4, whereby the arc tube 4 can be more reliably held.

Variation 1-2

Figure 5:
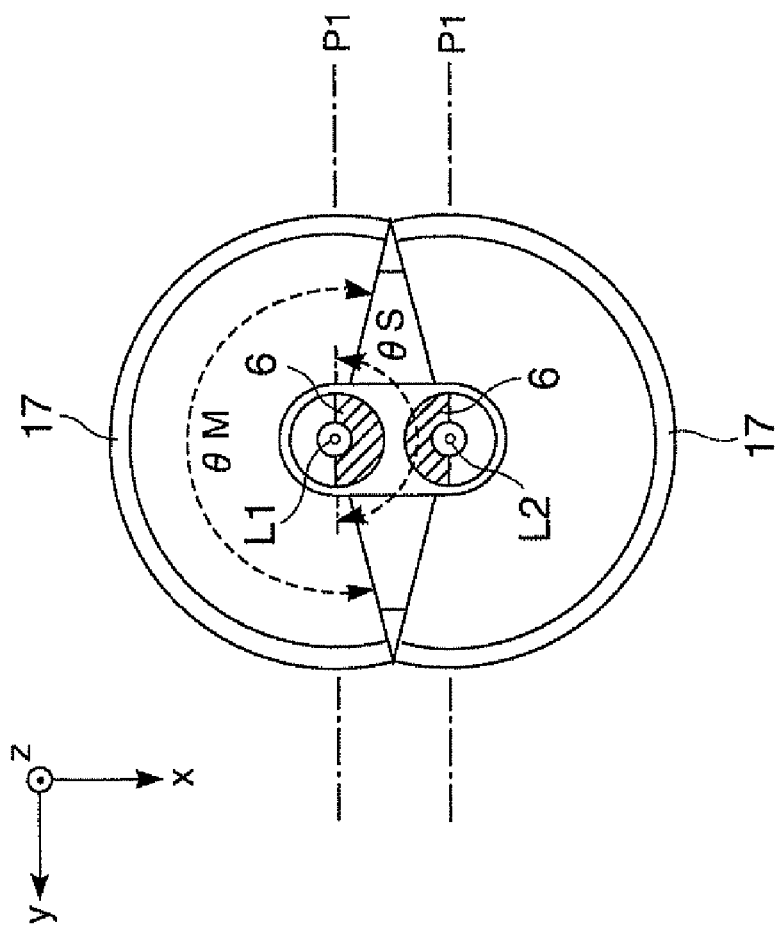
FIG. 5 is a front view of an illuminator of variation 1-2.

Alternatively, as shown in FIG. 5, the reflection mirror of each of the main reflectors 17 may slightly overlap with the reflection layer of the corresponding sub-reflector 6. That is, the main reflector 17 and the sub-reflector 6 may be configured in such a way that the following equations are satisfied: $\theta M \geqq 180°$ and $\theta S \geqq 180°$. As described above, since the light emitter 12 in each of the arc tubes 4 has a finite size, there is light that exits from positions spaced apart from the focal positions of the main reflector 17 and the sub-reflector 6. Employing the configuration shown in FIG. 5 allows the light exiting from the positions spaced apart from the focal positions of the reflectors 17 and 6 to be reflected off the reflector 17 or 6, whereby the light described above can be added to the light exiting from the illuminator along the lamp optical axis L1 (L2), and the amount of light that can be effectively used as the illumination light can be increased accordingly.

Second Embodiment

A second embodiment of the invention will be described below with reference to FIGS. 6A and 6B.

The basic configuration of an illuminator of the present embodiment is similar to that of the first embodiment and only differs therefrom in terms of the configuration of the sub-reflectors.

Figure 6A:
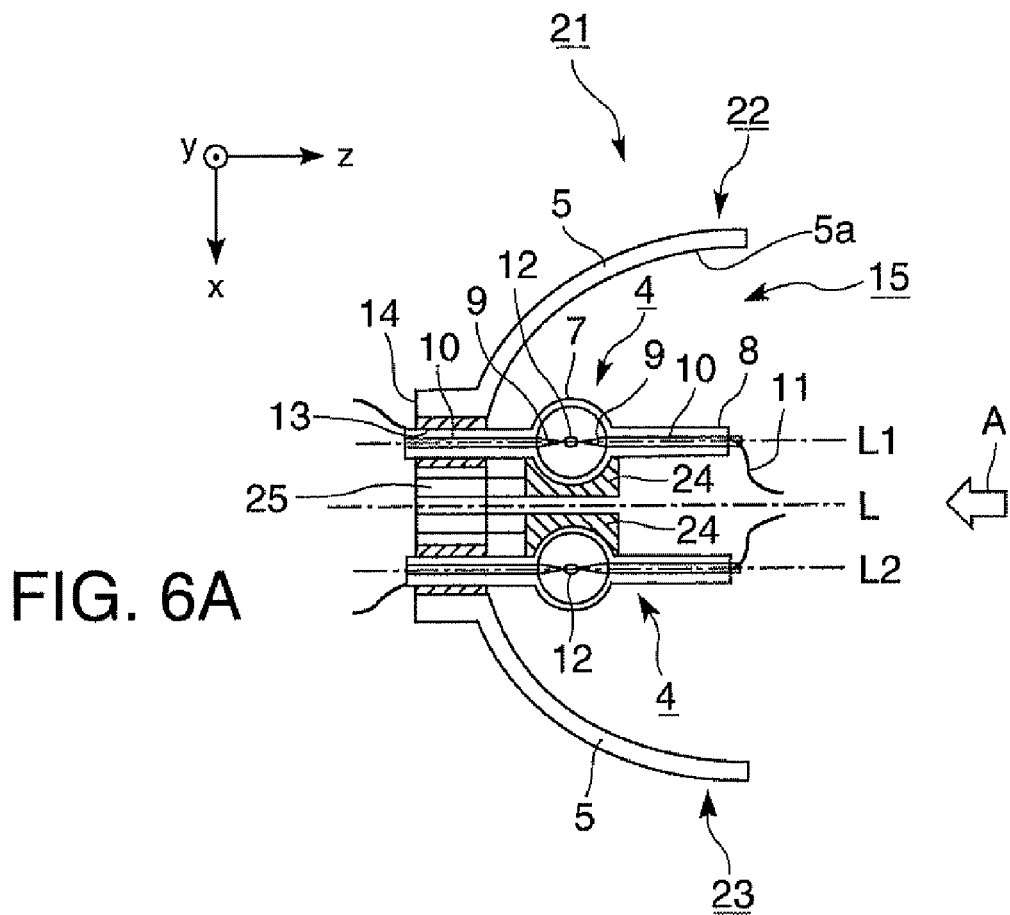
FIGS. 6A and 6B show the configuration of an illuminator of a second embodiment of the invention.
Figure 6B:
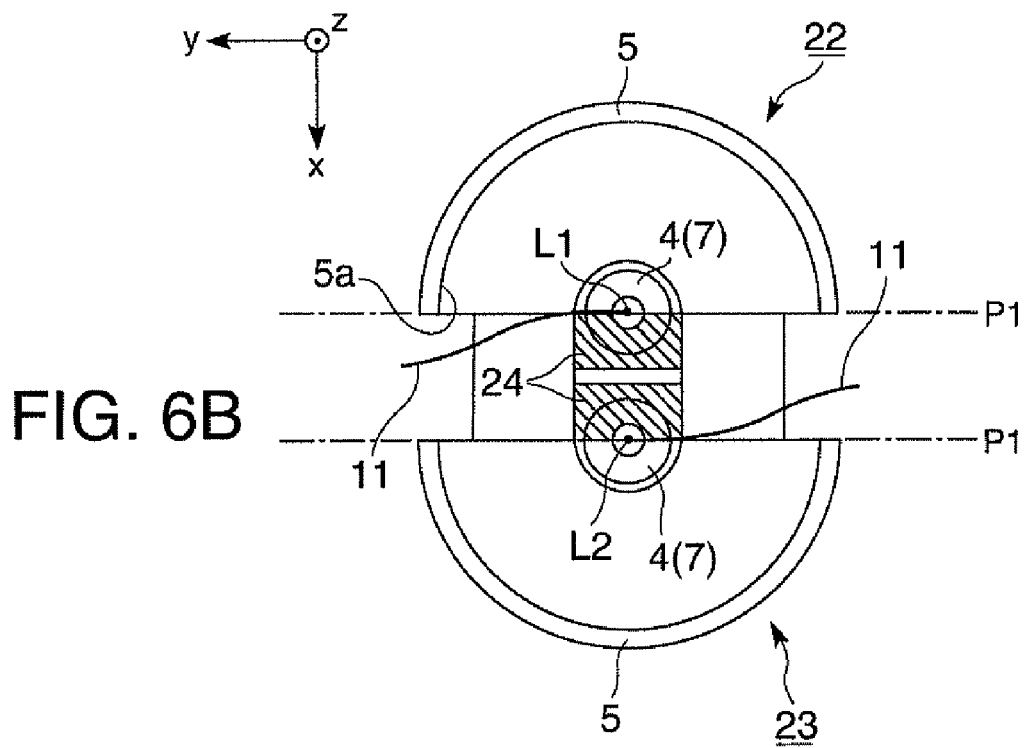

FIGS. 6A and 6B show the configuration of the illuminator of the present embodiment. FIG. 6A is a side cross-sectional view taken along a plane including an illumination optical axis and two light emitters, which will be described later. FIG. 6B is a front view of the illuminator when viewed from the direction in which the illumination optical axis extends (the direction indicated by the arrow A in FIG. 6A). In FIGS. 6A and 6B, the components common to those in FIGS. 1A and 1B have the same reference characters and no description thereof will be made.

While the reflection layer formed on the surface of the bulb 7 of each of the arc tubes 4 is used as the sub-reflector 6 in the first embodiment, a reflection mirror, a separate component from the arc tube 4, disposed in the vicinity of or in intimate contact with the arc tube 4 is used as a sub-reflector 24 in the present embodiment. In the illuminator 21 of the present embodiment, the sub-reflector 24 is formed of a reflection mirror having a spherically concave reflection surface, and the reflection mirror is fixed to the neck portion 14 of the corresponding main reflector 5 via a support 25, as shown in FIGS. 6A and 6B. The reflection mirror is obtained by forming a reflection layer on a base having a spherically concave recess, specifically, on the inner surface of the recess. The reflection mirror is disposed in intimate contact with the arc tube 4 or in the vicinity thereof but slightly spaced apart therefrom in such a way that the light emitter 12 in the arc tube 4 is located in the focal position of the reflection mirror.

The base and the support of the reflection mirror is preferably made of the same material as that of the arc tube 4, for example, quartz glass or sapphire, and the reflection layer is preferably made of a material similar to that of the sub-reflector 6 in the first embodiment. Since the coefficients of thermal expansion of the base and the support of the reflection mirror can be the same as that of the arc tube 4 by using the same material for these components, the position where the reflection mirror is attached is readily maintained with precision, whereby the light reflected off the reflection mirror will efficiently return to a desired position Further, since quartz glass and sapphire have high heat resistance, the reflection mirror made thereof is advantageously unlikely broken.

In the illuminator 21 of the present embodiment as well, advantages similar to those provided in the first embodiment are provided: For example, the illuminator can be reduced in size, and illumination light that can be efficiently used can be produced by producing intense light fluxes in portions that are in the vicinity of the illumination optical axis and symmetric with respect thereto. Further, although the illuminator is slightly larger than that in the first embodiment, in which each of the sub-reflectors is formed of the reflection layer formed on the surface of the corresponding arc tube, the following advantages are provided.

That is, since the spherical transparent member that forms the bulb 7 of each of the arc tubes 4 has a certain thickness, light that passes through the transparent member undergoes refraction, what is called a lens effect. The concave shape, the curvature, and other optical characteristics of the reflection mirror can be set and the position where the reflection mirror is attached can be adjusted in consideration of the lens effect of the bulb 7. In this way, the light reflected off the reflection mirror readily returns to a desired position, and how efficiently the light from the light source 22 (23) is used is readily increased. Further, since the reflected light will not impinge on the electrodes 9 in the arc tube 4 by adjusting as appropriate the position where the reflection mirror is attached, the life of the arc tube 4 is effectively prolonged. Moreover, when the reflection mirror is disposed in a position spaced apart from the bulb 7 so that there is a gap between the reflection mirror and the bulb 7, which becomes hot during the operation, the heat will not degrade the reflection mirror and the optical characteristics and the accuracy in the attachment position are readily maintained.

Variation 2-1

Figure 7:
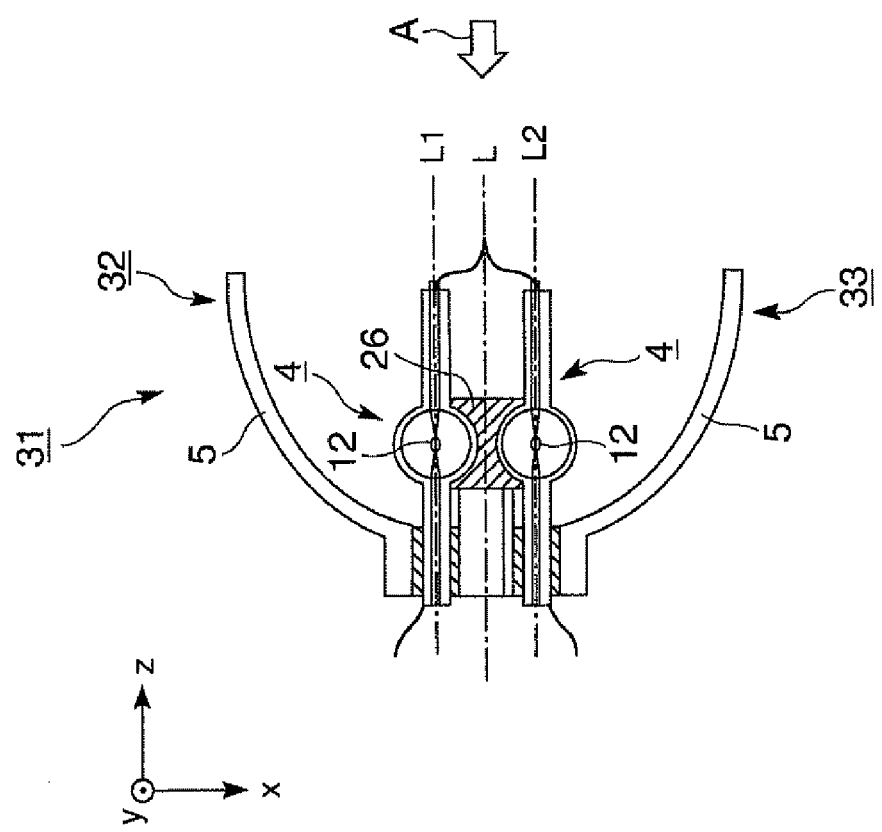
FIG. 7 is a side cross-sectional view of an illuminator of Variation 2-1.

While the sub-reflector 24 in a first light source 22 and the sub-reflector 24 in a second light source 23 are separate components in the above embodiment, the sub-reflectors in the two light sources may be integrated. That is, FIG. 7 shows an illuminator 31 using a sub-reflector 26 formed by providing spherically concave recesses on both sides of a single support, producing a reflection mirror formed of a reflection layer on the inner surface of each of the recesses, and placing the reflection mirrors symmetrically with respect to the illumination optical axis L. In this configuration, since the distance between a first light source 32 and a second light source 33 (two arc tubes 4) can be reduced by reducing the thickness of the sub-reflector 26, the diameter of the exiting light flux and the size of the illuminator can be reduced. Further, the number of parts of the sub-reflector can be reduced, whereby the cost is reduced accordingly.

Third Embodiment

A third embodiment of the invention will be described below with reference to FIG. 8.

The basic configuration of an illuminator of the present embodiment is similar to those of the first and second embodiments and only differs therefrom in terms of the configuration of the main reflectors.

Figure 8:
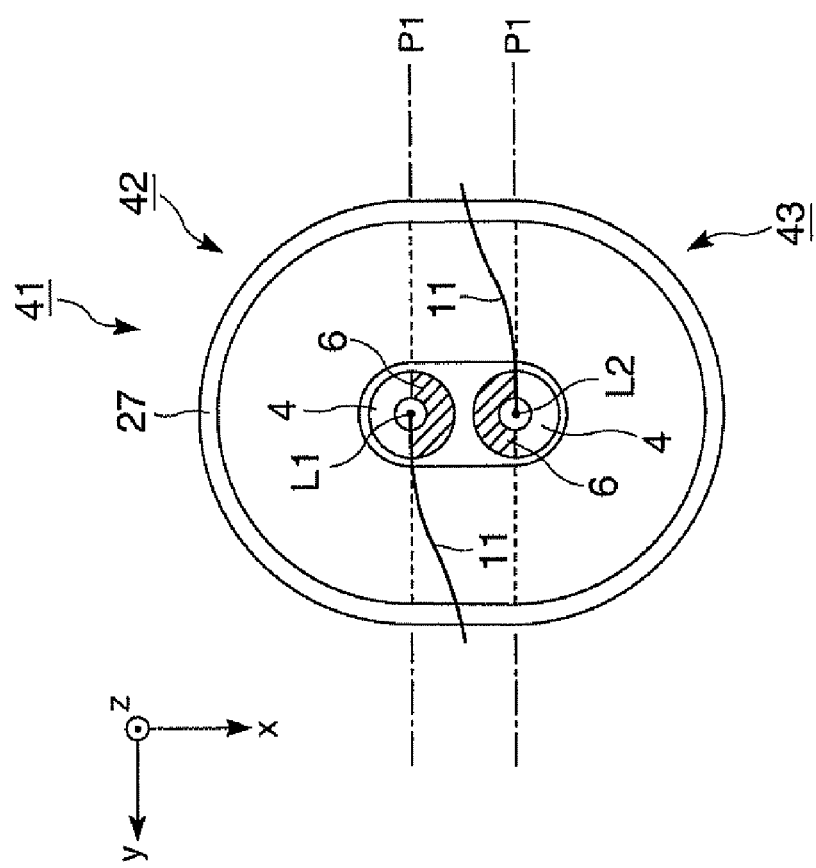
FIG. 8 is a front view showing the configuration of an illuminator of a third embodiment of the invention.

FIG. 8 is a front view of the illuminator of the present embodiment when viewed from the direction in which the illumination optical axis extends. In FIG. 8, the components common to those in FIG. 1B have the same reference characters and no description thereof will be made.

In the above embodiment, the main reflector 5 in the first light source 32 and the main reflector 5 in the second light source 33 are separate components. In contrast, in an illuminator 41 of the present embodiment, the main reflector in a first light source 42 and the main reflector in a second light source 43 are integrated into a single reflector 27, as shown in FIG. 8. Therefore, the reflection mirror is also formed on the inner surface of the base of the portion of the main reflector 27 between the plane P1 including the lamp optical axis L1 and the plane P1 including the lamp optical axis L2.

In the illuminator 41 of the present embodiment as well, advantages similar to those provided in the first embodiment are provided: For example, the illuminator can be reduced in size, and illumination light that can be efficiently used can be produced by producing intense light fluxes in portions that are in the vicinity of the illumination optical axis and symmetric with respect thereto. Further, integrating the main reflector in the first light source 42 with the main reflector in the second light source 43 into the main reflector 27 allows the lamp optical axes L1 and L2 of the light sources 42 and 43 to be readily aligned with each other and the number of parts and hence the cost to be reduced. Moreover, employing the configuration in which the reflection mirror of each of the main reflectors 27 overlaps with the reflection layer of the corresponding sub-reflector 6 allows the light exiting from positions spaced apart from the focal positions of the reflectors 27 and 6 to be reflected off the reflector 27 or 6, whereby the light described above can be added to the light exiting from the illuminator along the lamp optical axes L1 (L2), and the amount of light that can be effectively used as the illumination light can be increased accordingly, as in the case of the configuration in Variation 12.

Fourth Embodiment

A fourth embodiment of the invention will be described below with reference to FIGS. 9A and 9B.

The basic configuration of an illuminator of the present embodiment is similar to those of the first to third embodiments and only differs therefrom in that the first light source and the second light source are separated from each other by a separation plate.

Figure 9A:
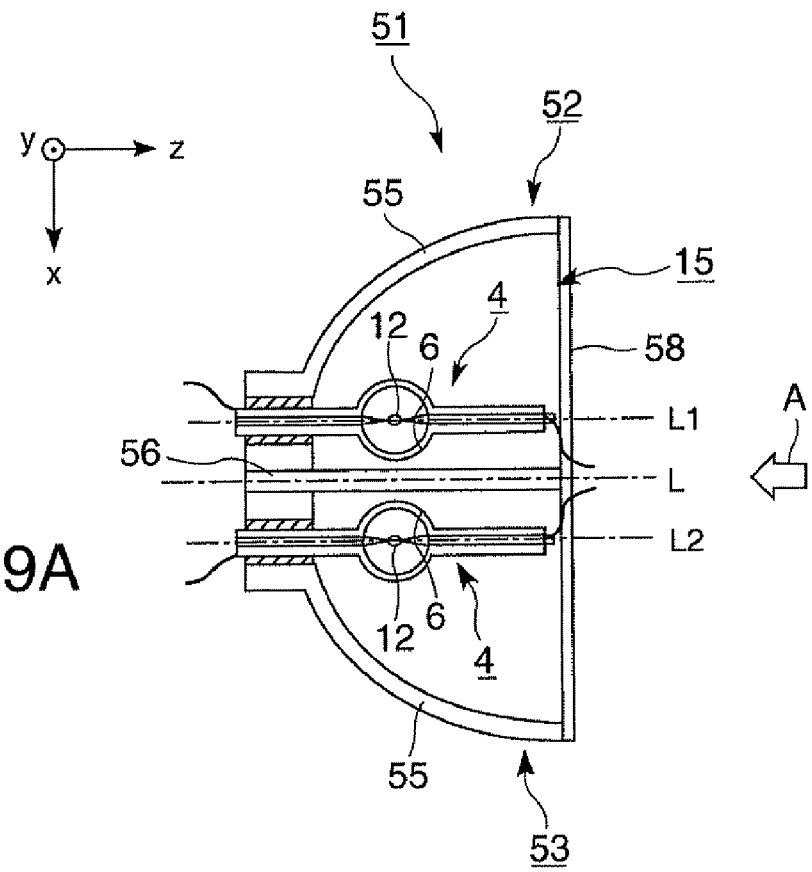
FIGS. 9A and 9B show the configuration of an illuminator of a fourth embodiment of the invention.
Figure 9B:
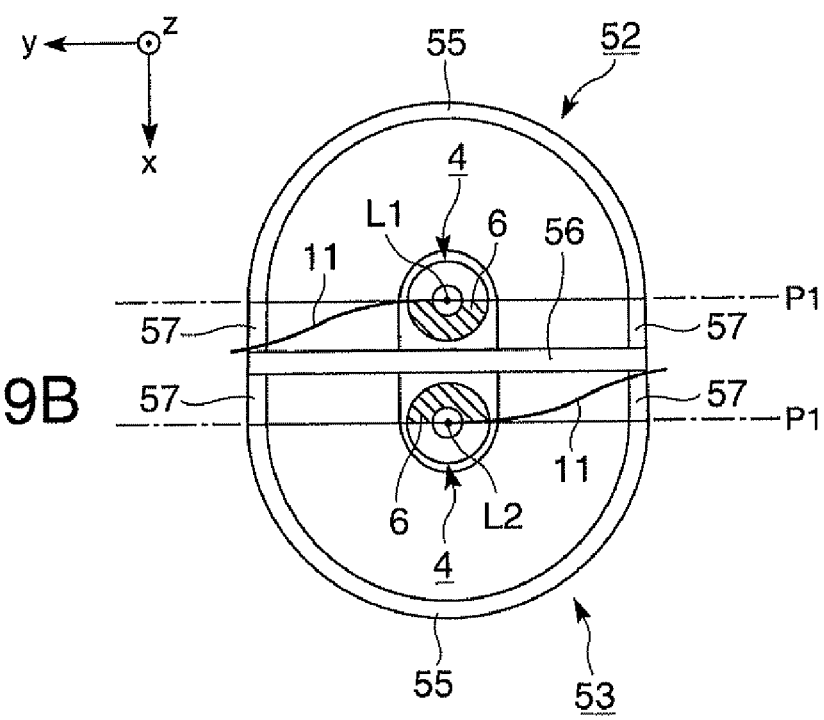

FIGS. 9A and 9B show the configuration of the illuminator of the present embodiment. FIG. 9A is a side cross-sectional view taken along a plane including an illumination optical axis and two light emitters, which will be described later. FIG. 9B is a front view of the illuminator when viewed from the direction in which the illumination optical axis extends (the direction indicated by the arrow A in FIG. 9A). In FIGS. 9A and 9B, the components common to those in FIGS. 1A and 1B have the same reference characters and no description thereof will be made.

In the illuminator 51 of the present embodiment, a separation plate 56 formed of a single plate is disposed between a first light source 52 and a second light source 53 along the illumination optical axis L, as shown in FIGS. 9A and 9B. The separation plate 56 partitions the space in which the arc tubes 4 in the first and second light sources 52, 53 are disposed. Only the base extends from each end of each main reflector 55 beyond the plane P1 including the lamp optical axis L1 (L2) to the position where the end comes into contact with the separation plate 56. Therefore, no reflection mirror is formed on part of the inner surface of each of the main reflectors 55, that is, the areas between the plane P1 including the lamp optical axis L1 and the plane P1 including the lamp optical axis L2. These portions serve as connection portions 57 that connect the main reflectors 55 to the separation plate 56. That is, in each of the first and second light sources 52, 53, the main reflector 55, the separation plate 56, and the corresponding connection portions 57 form a spacer and the corresponding arc tube 4 is positioned in the space.

In the illuminator 51 of the present embodiment as well, advantages similar to those provided in the first embodiment are provided: For example, the illuminator can be reduced in size, and illumination light that can be efficiently used can be produced by producing intense light fluxes in portions that are in the vicinity of the illumination optical axis and symmetric with respect thereto. Further, in the present embodiment, the separation plate 56 partitions the space in which the arc tubes 4 are disposed into separate light source spaces. Therefore, for example, if the arc tube 4 in one of the first and second light sources 52, 53 is broken, the other light source is not affected.

While no reflection mirror is formed on the connection portions 57 in the above embodiment, reflection mirrors may be formed thereon. When reflection mirrors are formed on the connection portions 57, the resultant configuration is equivalent to a configuration in which the reflection mirror of each of the main reflectors overlaps with the reflection layer of the corresponding sub-reflector, and light exiting from positions spaced apart from the focal positions of the reflectors can be reflected off one of the reflectors, whereby the light described above can be added to the light exiting from the illuminator along the lamp optical axes L1 (L2), and the amount of light that can be effectively used as the illumination light can be increased accordingly. The same advantage as that provided in the third embodiment is thus provided.

Variation 4-1

Figure 10A:
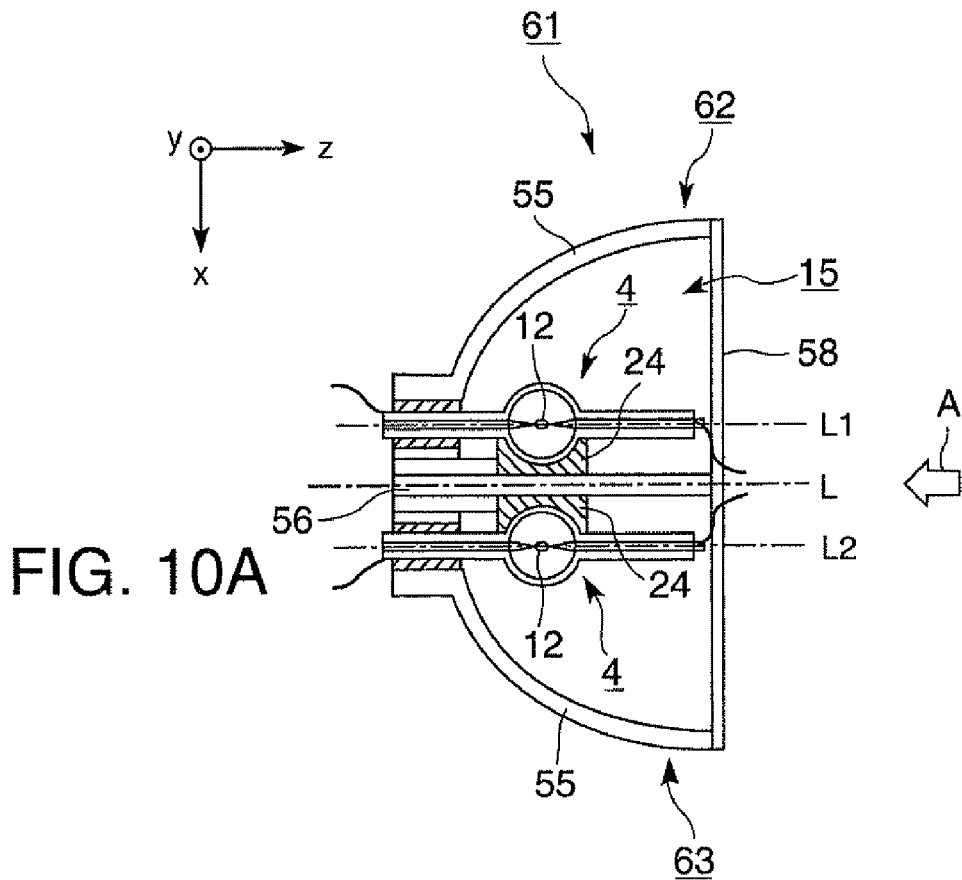
FIGS. 10A and 10B show the configuration of an illuminator of Variation 4-1.
Figure 10B:
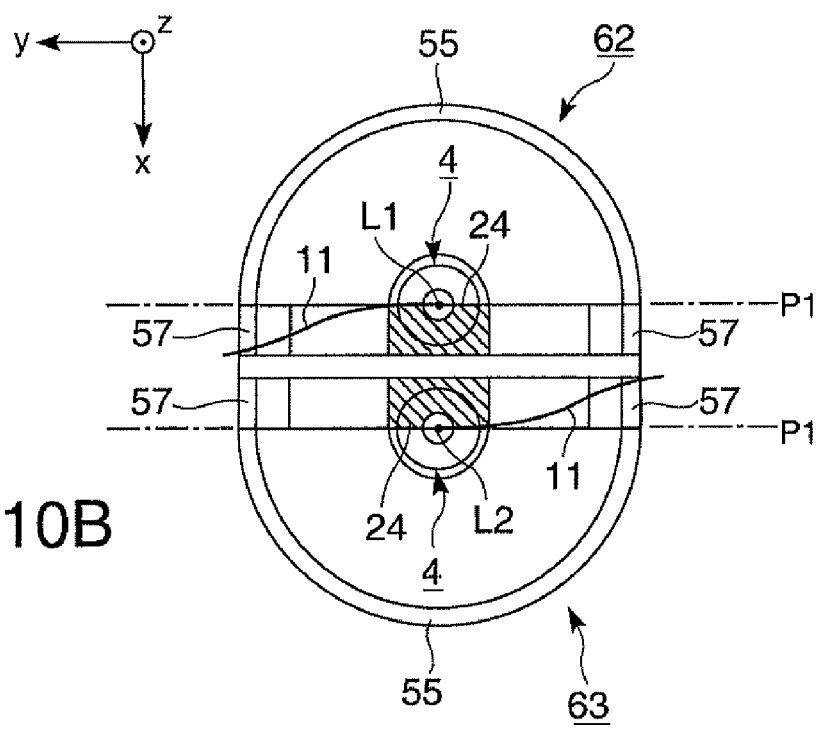

Each of the sub-reflectors 6 used in the above embodiment is formed of the reflection layer formed on the surface of the bulb of the corresponding arc tube 4. Instead of this configuration, a sub-reflector 24 formed of a reflection mirror that is a separate component from the arc tube may be used, as shown in FIGS. 10A and 10B. In this case, the sub-reflector 24 may be a separate component from the separation plate 56, or the support on which the reflection mirror of the sub-reflector 24 is formed may be extended to the main reflector 55 and the front opening 15 so that the extended support is used as the separation plate. In this case, the number of parts and the size of the light source can be reduced.

Further, a light-transmissive front plate 58 may be disposed in the front opening 15 formed by the main reflectors 55, as shown in FIG. 9A and FIG. 10A. In this case, an anti-reflection layer is desirably formed on the front plate 58. According to the configuration, since each of the arc tubes 4 can be substantially sealed in the space surrounded by the corresponding main reflector 55 and connection portions 57, the separation plate 56, and the front plate 58, the arc tube 4, when used in a projector or any other similar apparatus, will not unnecessarily interfere with other components. Further, if the arc tube is exploded, debris, such as glass pieces of the arc tube, will not scatter through the front opening 15 of the light source, whereby the safety is improved.

As shown in FIGS. 10A and 10B, when the sub-reflectors 24, each of which is formed of the separate reflection mirror, are used, the supports of the sub-reflectors 24 and the separation plate 56 may be fixed to the front plate 58. In this way, the reflection mirrors can be more accurately attached. Further, the front plate 58 formed of a light-transmissive plate may be replaced with an integrator device, a light collection device, or any other suitable optical component. This configuration allows the number of parts and the size of the illuminator to be reduced. Alternatively, instead of employing a fully sealed structure, an opening may be provided at part of any of the members that surround each of the arc tubes 4. In this case, air can be introduced and discharged through the opening, whereby the arc tube 4 is readily cooled.

Variation 4-2

Figure 11A:
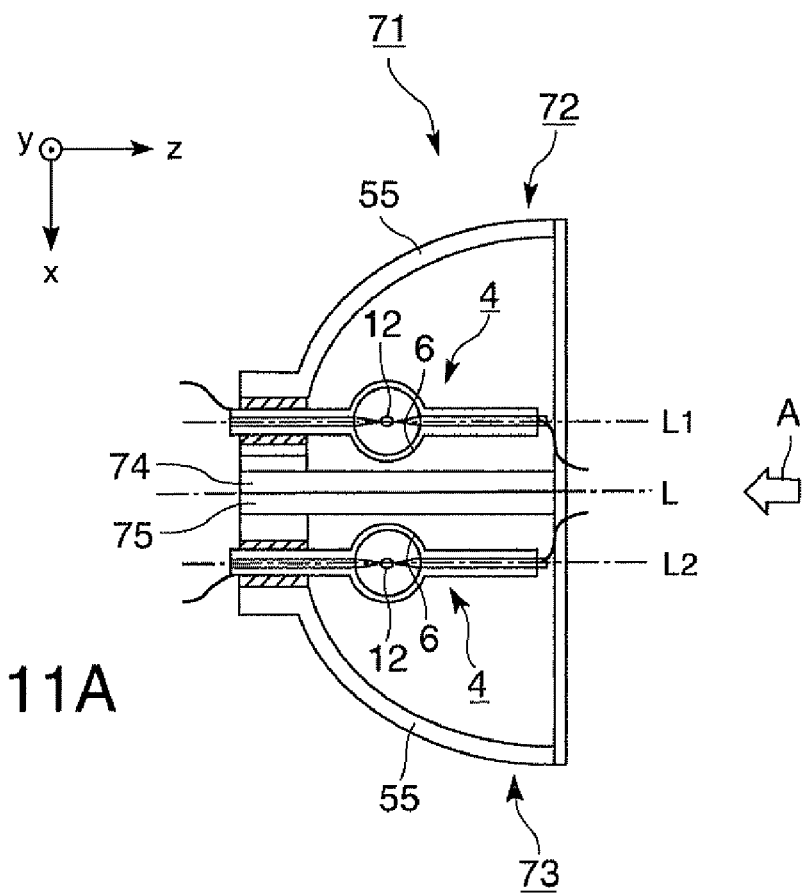
FIGS. 11A and 11B show the configuration of an illuminator of Variation 4-2.
Figure 11B:
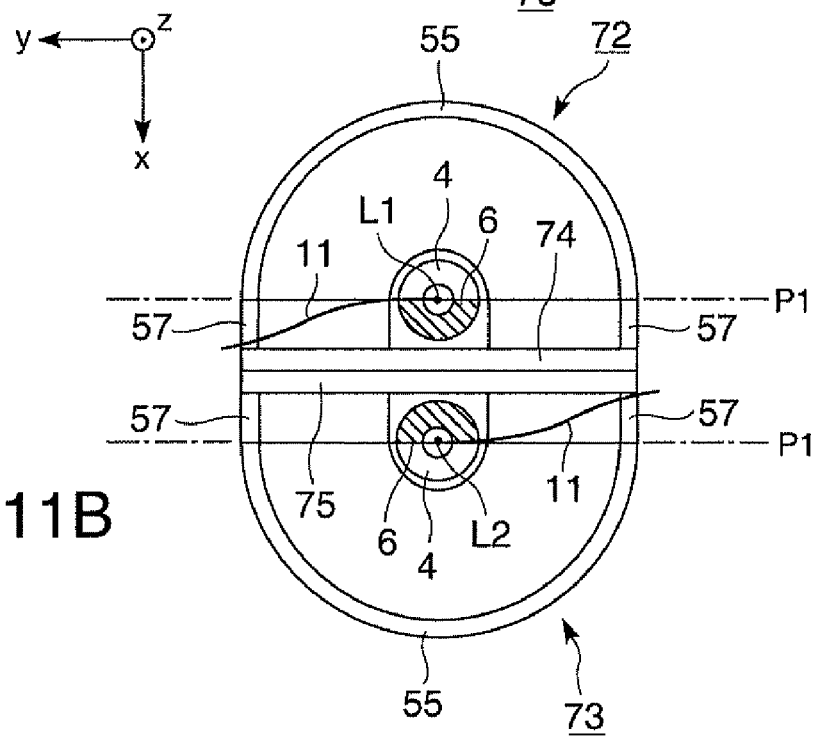
Figure 12A:
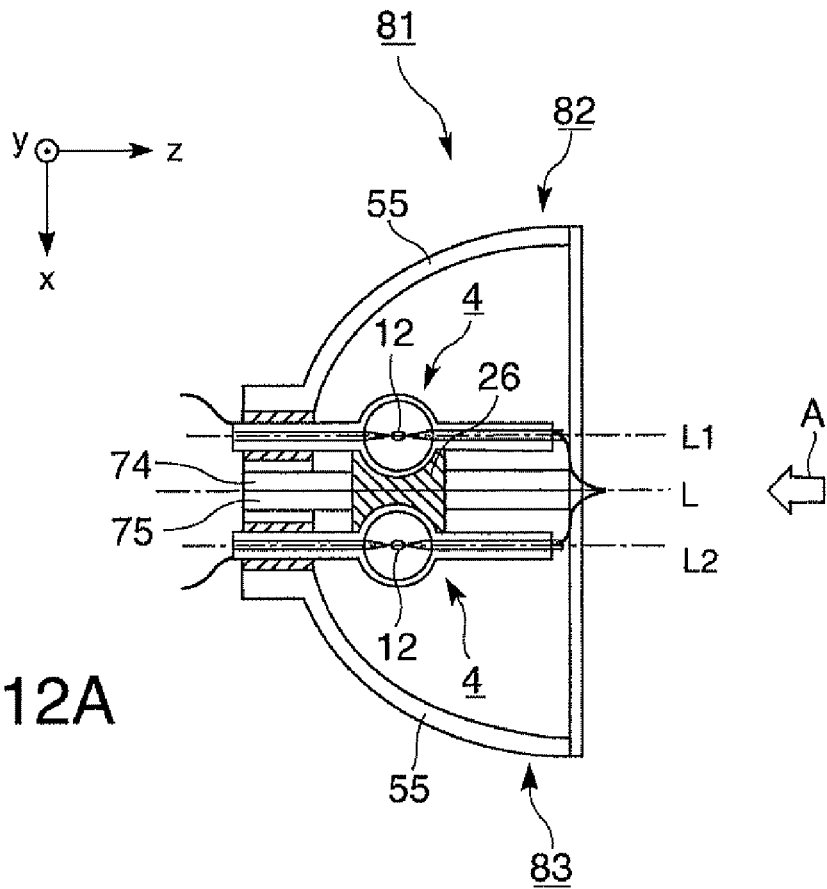
FIGS. 12A and 12B show another example of the configuration of the illuminator of Variation 4-2.
Figure 12B:
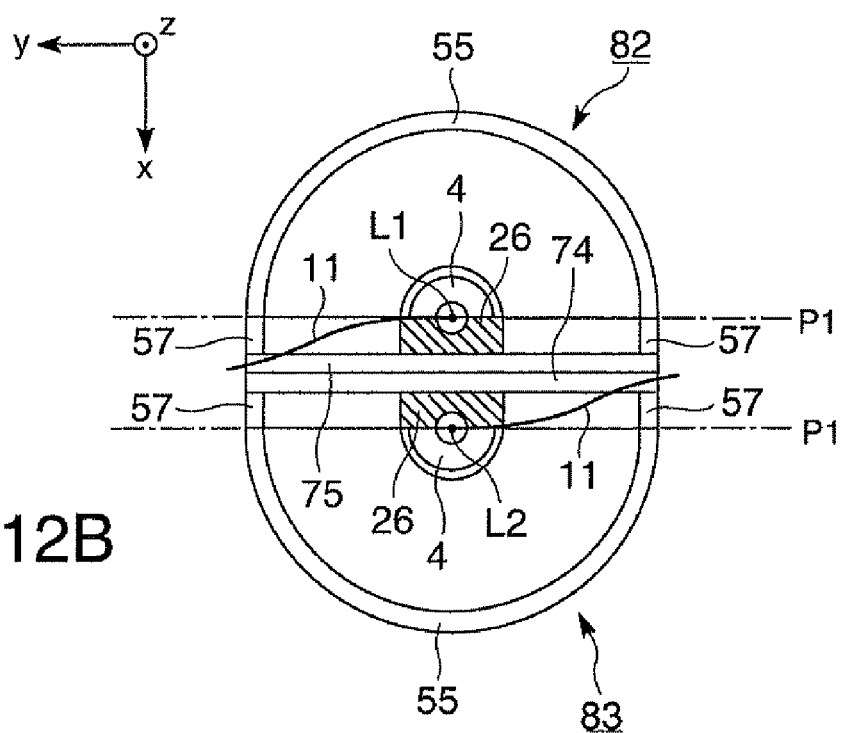

In the above embodiment, the separation plate that spatially separates the two arc tubes is formed of a single plate, and the first and second light sources share the separation plate. This configuration may be replaced with a configuration in which a separation plate is provided for each light source. That is, the separation plate is formed of two separation plates, a first separation plate 74 in first light sources 72 and 82 and a second separation plate 75 in second light sources 73 and 83, as shown in FIGS. 11A, 11B and FIGS. 12A, 12B. FIGS. 11A and 11B show an example using the sub-reflectors 6, each of which is formed of the reflection layer on the surface of the corresponding arc tube 4, and FIGS. 12A and 12B show an example using the sub-reflectors 26, each of which is formed of the reflection mirror that is a separate component from the corresponding arc tube 4. According to these configurations, since the interface between the first separation plate 74 and the second separation plate 75 makes the first light sources 72, 82 and the second light sources 73, 83 independent of each other, each of the light sources is readily attached and detached on a light source basis. Therefore, for example, if either the first light sources 72, 82 or the second light sources 73, 83 fail to emit light, the failed light source can be exchanged without having to turn off the other light source, whereby the operability can be improved.

Fifth Embodiment

A fifth embodiment of the invention will be described below with reference to FIGS. 13A and 13B to 15.

The present embodiment is a projector including any of the illuminators of the first to fourth embodiments.

Figure 14:
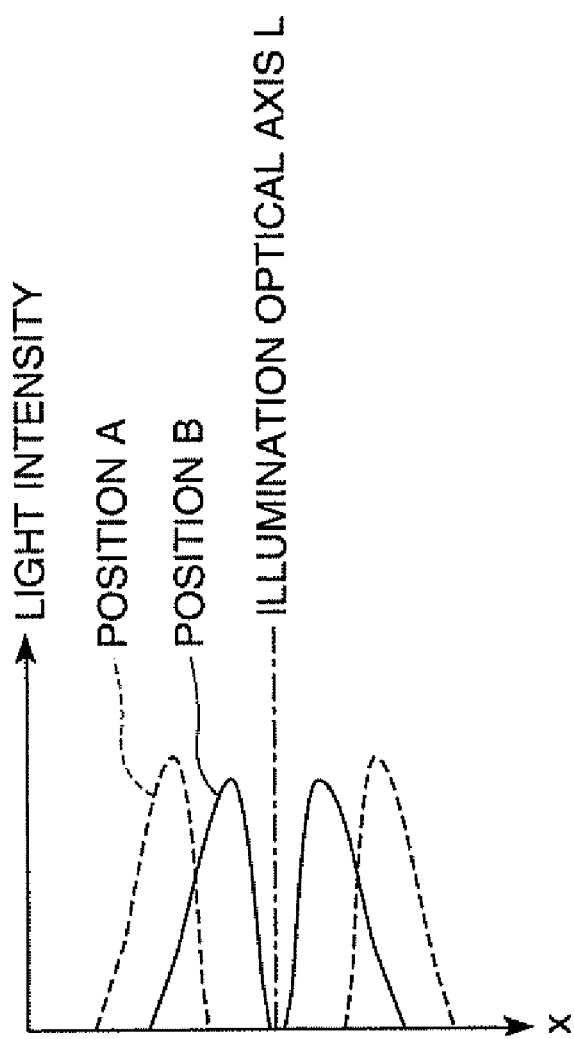
FIG. 14 shows the light intensity distribution at specific positions in the present projector.
Figure 15:
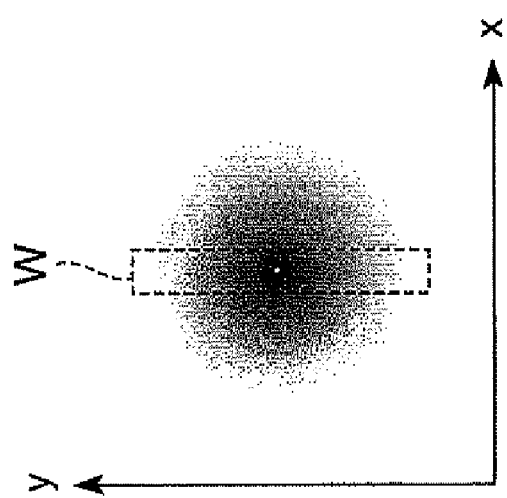
FIG. 15 shows the light intensity distribution in a plane perpendicular to an illumination optical axis at a specific position.

FIG. 13A is a schematic configuration diagram of the projector of the present embodiment. FIG. 13B shows a light path changing optical device when viewed from a direction different from the direction in which the light path changing optical device is viewed in FIG. 13A. FIG. 14 shows the light intensity distribution of the illumination light at specific positions in the projector shown in FIG. 13A. FIG. 15 shows the light intensity distribution of the illumination light in a plane perpendicular to the illumination optical axis at a specific position.

The projector 110 of the present embodiment includes the illuminator 1 of the first embodiment, for example, a light path changing optical device 111 (light path changer), a lens array integrator 114 (illuminance homogenizing system) formed of two lens arrays 112 and 113, a polarization conversion device 115, a superimposing lens 116, dichroic mirrors (color light separation system) 117 and 118, a reflection mirror 119, a relay system 120, parallelizing lenses 121, liquid crystal light valve units 122R, 122G, and 122B (light modulators), a dichroic prism 123, and a projection lens 124 (projection system), as shown in FIG. 13A. Each of the liquid crystal light valve units 122R, 122G, and 122B includes a light incident-side polarizer 125, a transmissive liquid crystal light valve 126, and a light exiting-side polarizer 127. The light path changing optical device 111, which is disposed downstream of the illuminator 1, works in such a way that the two optical axes of the illumination light fluxes from the illuminator 1 approach the illumination optical axis L.

The light having exited from the illuminator 1 passes through the light path changing optical device 111, passes through the lens array integrator 114, where the illuminance of the light is homogenized, passes through the polarization conversion device 115, where the light is converted into specific linearly polarized light, and exits from the polarization conversion device 115. The light having exited from the polarization conversion device 115 passes through the superimposing lens 116, impinges on the dichroic mirrors 117 and 118, where the light is separated into three color light fluxes (B, G, and R light fluxes) having different wavelength ranges. The three color light fluxes pass through the parallelizing lenses 121 and are incident on the liquid crystal light valve units 122R, 122G, and 122B, which correspond to the respective color light fluxes. The B light is incident on the liquid crystal light valve unit 122B via the relay system 120 including a parallelizing lens 128, a relay lens 129, and reflection mirrors 130 and 131 so that the optical illumination path length of the B light is equal to those of the other two color light fluxes.

The liquid crystal light valve units 122R, 122G, and 122B corresponding to the respective color light fluxes modulate the incident light fluxes in accordance with an image signal, and output the color light fluxes that reflect the image information. The color light fluxes having exited from the liquid crystal light valve units 122R, 122G, and 122B are combined into a single light flux by the cross dichroic prism 123, and the projection lens 124 projects the combined light on a projection surface. A color image is thus formed.

The light path changing optical device 111 is a flat plate-shaped, light-transmissive optical device made of glass or resin and having a light incident-side end surface and a light exiting-side end surface disposed parallel to each other. The light path changing optical device 111 is shaped in such a way that the far ends on both sides of the illumination optical axis L are shifted toward the lens array integrator 114. That is, the light path changing optical device 111 has a cross-sectional shape having two parallelograms disposed symmetrically with respect to the illumination optical axis L when taken along an xz plane (the contour in FIG. 13A), whereas having a rectangular cross-sectional shape when taken along a yz plane (the contour in FIG. 13B). The light incident on the light incident-side end surface 111a of the light path changing optical device 111 is refracted in the xz plane so that the light is deflected toward the illumination optical axis L, is again refracted at the light exiting-side end surface 111b so that the inclination of the refracted light returns back to that of the incident light, and then exits through the light exiting-side end surface. On the other hand, the light is not refracted in the yz plane, but passes straight through the light path changing optical device 111, and exits therefrom. That is, the light path changing optical device 111 shifts (translates) the positions of the light fluxes in the xz plane toward the illumination optical axis L while substantially maintaining the angular distributions of the light fluxes. Therefore, the light path changing optical device 111 shifts (translates) the positions of the light fluxes only in one direction. The direction in which the positions of the light fluxes are shifted corresponds to the direction in which the two light sources 2 and 3 are disposed side by side in the illuminator 1. The amount of shift (the amount of translation) of the light fluxes toward the illumination optical axis L can be adjusted by changing the refractive index of the material of the light path changing optical device 111 and the thickness thereof (the dimension in the z-axis direction).

FIG. 14 shows the intensity distributions of the illumination light at a position between the illuminator 1 and the light path changing optical device 111 (the position indicated by the broken line A in FIG. 13A) and a position between the light path changing optical device 111 and the lens array integrator 114 (the position indicated by the broken line B in FIG. 13A). In the illuminator according to an aspect of the invention, since only the light reflected off the main reflectors exits as the illumination light, no light exits from the area between the two arc tubes including the illumination optical axis L and the vicinity of the area, as shown in FIG. 14. Therefore, as shown in the light intensity distribution at the position A, the illumination light having exited from the illuminator 1 has what is called a center-missing distribution. When the illumination light having exited from the light sources and having the center-missing distribution passes through the light path changing optical device 111 the illumination light is translated toward the illumination optical axis L, and the diameter of the illumination light flux decreases in the x-axis direction accordingly. As a result, the illumination light having the center-missing distribution is converted into illumination light having an improved distribution, as shown in the light intensity distribution at the position B.

In general, the illumination efficiency (light collection efficiency) in an illumination system increases as the light flux diameter of the illumination light decreases, provided that the angular distribution remains the same. Therefore, using the thus configured light path changing optical device 111 allows the illumination light having exited from the illuminator 1 to be converted into illumination light that will be readily used in the following optical system.

As described above, the projector 110 of the present embodiment including the illuminator 1 of the first embodiment can improve the illumination efficiency, increase the brightness of a displayed image, and improve the quality thereof.

In the projector 110 of the present embodiment, each of the liquid crystal light valve units 122R, 122G, and 122B has a horizontally elongated, rectangular display area. The term "horizontally elongated" used herein means that each of the liquid crystal light valve units 122R, 122G, and 122B in FIG. 13A is longer in the x direction than in the y direction. Therefore, the direction in which the first and second light sources 2, 3 are disposed side by side in the illuminator 1 is designed to coincide with the direction that can be effectively used in the display operation. For example, in the present embodiment, the direction in which the first and second light sources 2, 3 are disposed side by side coincides with the direction of the longer side of the display area of each of the liquid crystal light valve units 122R, 122G, and 122B.

Since the light emitter 12 in each of the arc tubes 4 is not a point light source but has a finite size, there is light radiated from positions spaced apart from the focal positions of the corresponding main reflector 5 and sub-reflector 6. The light described above is reflected off neither of the reflectors and hence is not added to the illumination light that exits through the front opening of the main reflector 5 in some cases. Therefore, the light intensity of the illumination light that exits from the area sandwiched between the two arc tubes 4 and the vicinity of the area may be lower than those in the other areas, and the symmetry of the light intensity tends to deteriorate in this portion. FIG. 15 shows the light intensity distribution of the illumination light in the cross-section perpendicular to the illumination optical axis L at the position B in FIG. 13A, and the area boxed by the broken line W in FIG. 15 corresponds to the illumination light whose light intensity likely deteriorates in terms of symmetry. In FIG. 15, a higher light intensity area is drawn in denser black.

Therefore, in the present embodiment, to illuminate each of the liquid crystal light valves (object to be illuminated) with the light having the intensity distribution shown in FIG. 15, the light flux whose light intensity likely deteriorates in terms of symmetry is used along the shorter side of each of the illuminated area (the y direction in FIG. 13A). In this way, unevenness in brightness, color, contrast, and other parameters due to the decrease in symmetry of the light intensity can be reduced as compared to a case where the light flux described above is used along the longer side of each of the illuminated areas (the x direction in FIG. 13A).

However, in consideration of other factors, the light flux whose light intensity likely deteriorates in terms of symmetry is not necessarily used along the shorter side of each of the illuminated areas, but may be used along the longer side.

When an illuminator having a gap between the two main reflectors 5 is used as shown in FIGS. 1B and 6B, and the first and second light sources are disposed side by side in the horizontal direction, a space open in the vertical direction is created between the two main reflectors 5. The space can therefore be used to efficiently dissipate heat. That is, since the temperature of each of the arc tubes 4 is typically higher at higher positions in the vertical direction, heat generated at higher positions can be smoothly dissipated into the upper open space, whereby heat-related degradation of the corresponding sub-reflector disposed in the vicinity of the arc tube 4 can be reduced. In this case, since the distributions of heat generated in the two light sources are substantially the same, the environments and conditions under which the light sources are cooled are readily determined, whereby the illuminator can be efficiently cooled.

Variation 5-1

Figure 16A:
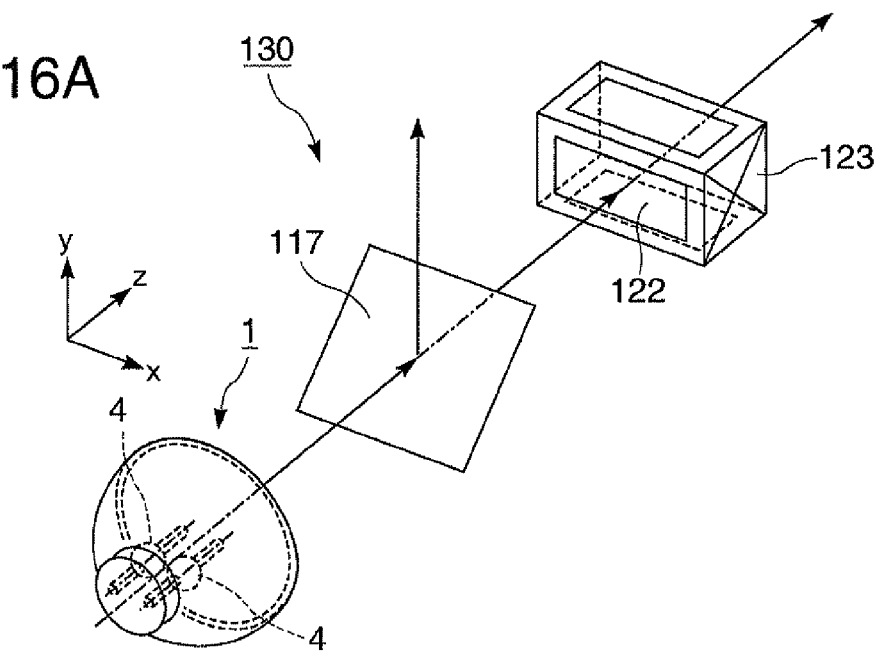
FIG. 16A shows an unfolded arrangement of specific optical elements in a projector of Variation 5-1.
Figure 16B:
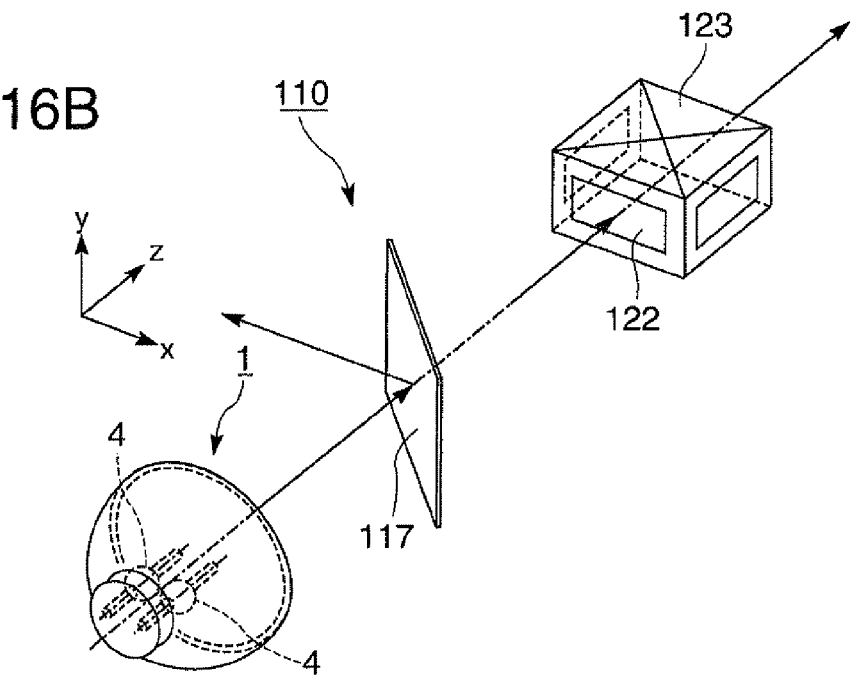
FIG. 16B shows an unfolded arrangement of specific optical elements in the projector shown in FIGS. 13A and 13B.

FIG. 16B shows an unfolded illumination light path of the G light in the projector of the above embodiment. In FIG. 16B, only the illuminator 1, the dichroic mirror 117, and the liquid crystal light valve 122 are extracted and shown in a perspective view to clarify the description. In general, optical characteristics of a dichroic mirror (dichroic layer) used in a projector greatly depend on the angle of incidence in the plane of incidence, and the plane of incidence with respect to the dichroic mirror is an xz plane in the arrangement shown in FIG. 16B. On the other hand, in the direction in which two arc tubes 4 (light sources) are disposed side by side in the illuminator, the illumination light is likely distributed in a greater angular range than that in the direction perpendicular to that direction or the proportion of light having large angular components tends to increase, even when the light path changing optical device 111 is used. The reason for this is that the angular components slightly increase due to the phenomenon having been described in FIG. 15 and refraction index dispersion that occurs when the light path changing optical device 111 shifts the light path. Therefore, when the dichroic mirror 117 is used in a color light separation system or a color light combining system, the direction in which the two arc tubes 4 (light sources) are disposed side by side coincides with the direction in which the dichroic mirror 117 performs color light separation when the arrangement shown in FIG. 16B is employed. In this case, unevenness in color and brightness may disadvantageously occur due to the incident angle dependence of the dichroic mirror 117. That is, the arrangement shown in FIG. 16B is advantageous in that unevenness in brightness, color, contrast, and other parameters due to the liquid crystal light valve 122 is reduced because the direction in which the two arc tubes 4 are disposed side by side coincides with the direction of the longer side of the liquid crystal light valve 122. On the other hand, the arrangement shown in FIG. 16B is not very preferred in that unevenness in brightness, color, and other parameters due to the dichroic mirror 117 likely occurs because the direction in which the two arc tubes 4 are disposed side by side coincides with the direction in which the incident angle dependence of the dichroic mirror 117 is large.

In contrast, in a projector 130 shown in FIG. 16A, the arrangement of the illuminator 1, the dichroic mirror 117, and the liquid crystal light valve 122 is determined in such a way that the direction in which the two arc tubes 4 are disposed side by side coincides with not only the direction perpendicular to the direction in which the dichroic mirror 117 performs color light separation (the plane of incidence with respect to the dichroic mirror is a yz plane) but also the direction of the longer side of the liquid crystal light valve 122. This configuration can reduce not only unevenness in brightness, color, and other parameters due to the dichroic mirror 117 but also unevenness in brightness, color, contrast, and other parameters due to the liquid crystal light valve 122. According to this configuration, the two advantages described above are combined, whereby the degradation of the quality of a displayed image can be sufficiently reduced.

Variation 5-2

Figure 17A:
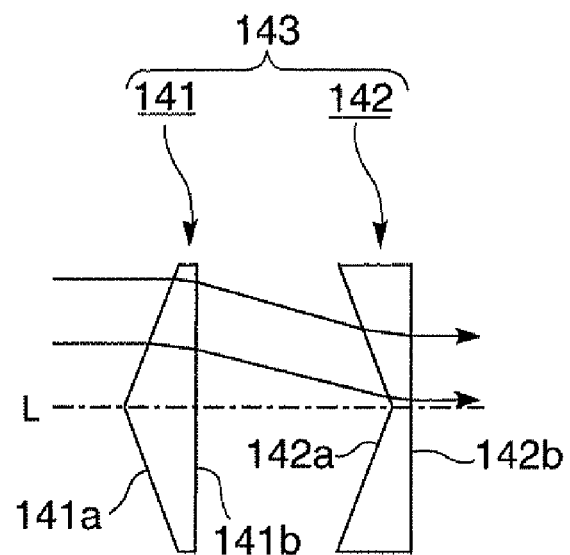
FIGS. 17A and 17B show other examples of the light path changing optical system.

The light path changing optical device used in the above embodiment has a shape obtained by deforming a flat plate-shaped optical device with respect to the illumination optical axis. Instead, the light path changing optical device may have other shapes. For example, FIG. 17A shows a light path changing optical system 143 that may be used. The light path changing optical system 143 includes a first optical device 141 in which one surface 141*a* is a convex conical surface and the other surface 141*b* is a flat surface and a second optical device 142 in which one surface 142*a* is a concave conical surface and the other surface 142*b* is a flat surface, the first optical device 141 and the second optical device 142 disposed in such a way that the illumination optical axis L is a common axis of symmetry. The one surface 141*a* of the first optical device 141 and the one surface 142*a* of the second optical device 142 are not necessarily conical surfaces, but may be aspheric surfaces or other surfaces.

Figure 17B:
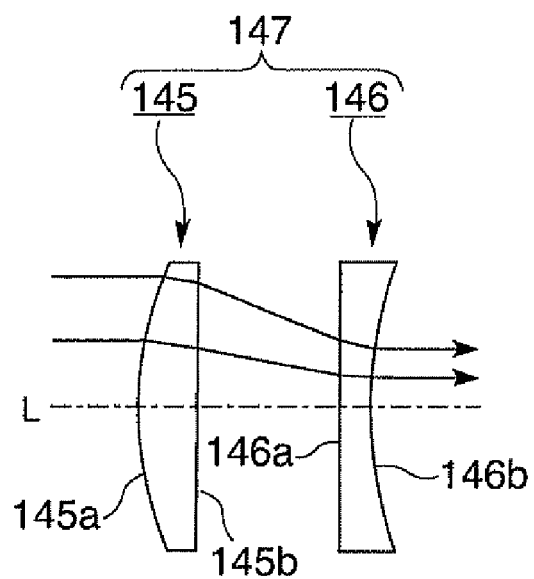

FIG. 17B shows another light path changing optical system that may be used. A light path changing optical system 147 includes a first optical device 145 in which one surface 145*a* is a convex lens surface and the other surface 145*b* is a flat surface and a second optical device 146 in which one surface 146*a* is a flat surface and the other surface 146*b* is a concave lens surface, the first optical device 145 and the second optical device 146 disposed in such a way that the illumination optical axis L is a common axis of symmetry.

While FIG. 17A shows an example in which the two optical devices, the first optical device 141 and the second optical device 142, form the light path changing optical system 143, and FIG. 17B shows an example in which the two optical devices, the first optical device 145 and the second optical device 146, form the light path changing optical system 147, a single device having a convex surface and a concave surface may form a light path changing optical device. That is, any optical system or optical device can be used as the light path changer of the invention as long as the optical system or the optical device having a shape including parallel flat surfaces in a small area through which common light passes.

The light path changing optical device 111 of the above embodiment has a function of translating the illumination light only in one direction (the x direction in FIGS. 13A and 13B, for example). On the other hand, when one of the light path changing optical systems 143 and 147 of the variations shown in FIGS. 17A and 17B is used, the illumination light can be translated in two directions (the x and y directions in FIG. 13A, for example) with respect to the illumination optical axis L and focused at the same time. In this way, the illumination light can be further reduced in diameter and brought further closer to the illumination optical axis L. In this case, the illumination light having exited from the illuminator can be converted into illumination light that will be more readily used in the following optical system.

Variation 5-3

In the above embodiment, a light path changing optical system is used to improve the center-missing distribution of the illumination light. Instead of using a light path changing optical system, the center-missing distribution can be improved by skillfully modifying the configuration of the lens array integrator.

Figure 18:
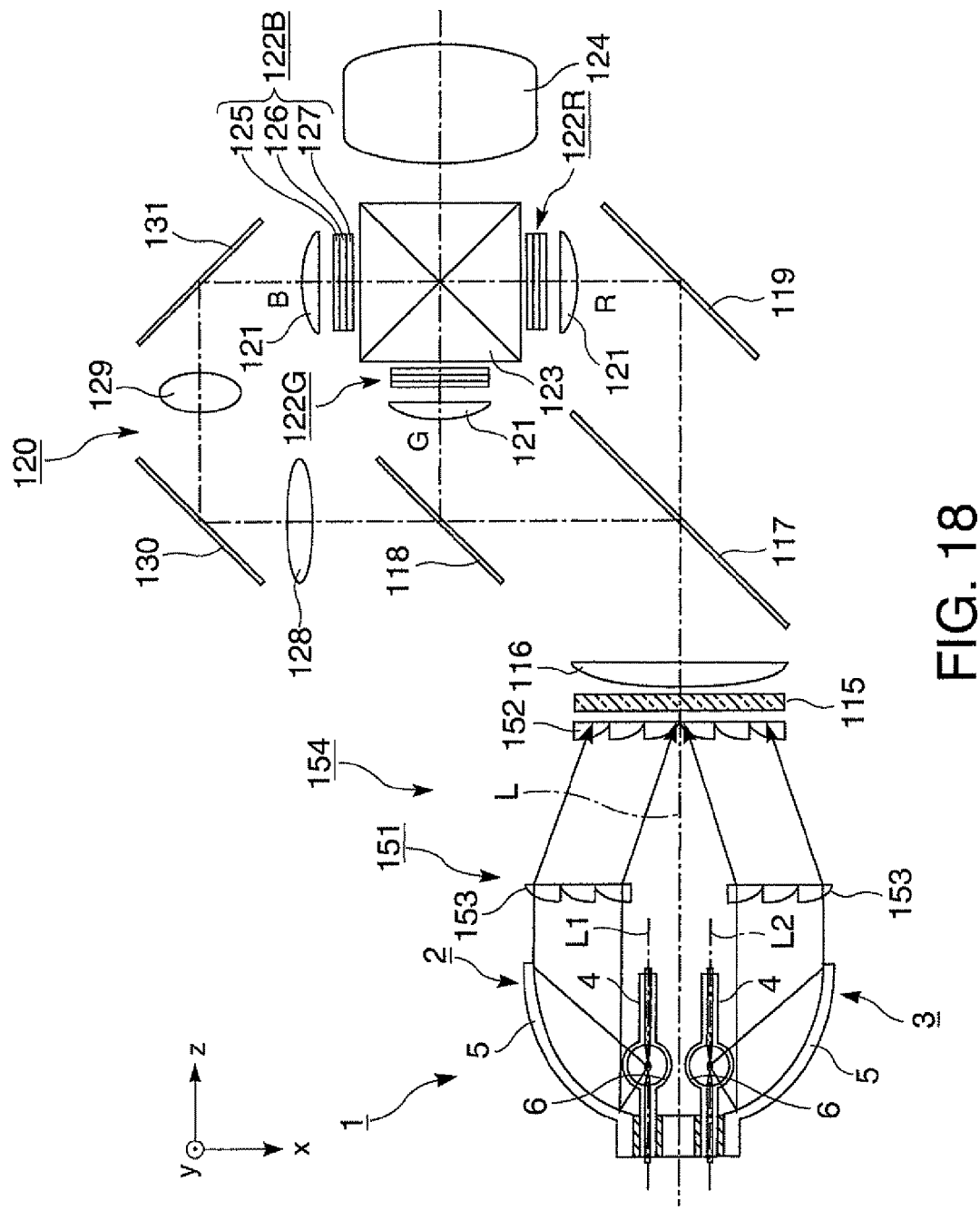
FIG. 18 is a schematic configuration diagram of a projector of Variation 5-3.

For example, as a lens array integrator 154, decentered lenses are used to form a first lens array 151 and a second lens array 152, as shown in FIG. 18. The first lens array 151, which is closer to the illuminator 1, includes two sub-lens arrays 153 spaced apart from each other in such a way that they correspond to the positions of the illumination light fluxes that exit from the light sources 2 and 3. The sub-lens arrays 153 may be disposed in positions spatially spaced apart from each other, or may be an integrated component in which the lens portions are disposed on both sides of a common support substrate.

In the configuration described above, the light fluxes incident on the two sub-lens arrays 153 are deflected toward the illumination optical axis L and incident on the second lens array 152. The center-missing distribution of the illumination light can thus be improved. According to this configuration, the spatial and angular distributions of the illumination light can be narrower and hence the illumination efficiency can be improved without use of any light path changing optical system, whereby the size of the apparatus and the number of parts can be reduced. Further, the use of decentered lenses is preferred because the light collection property of the lenslets in the first lens array 151 and the second lens array 152 as well as the deflection property in the x-axis direction in the first lens array 151 and the second lens array 152 can be independently controlled. It is further effective to use aspheric decentered lenses as the lenslets in the first lens array 151 and the second lens array 152. Since this configuration allows the deflection property not only in the x-axis direction but also in the y-axis direction to be independently controlled, the transfer efficiency of the illumination light from the first lens array 151 to the second lens array 152 can be further increased, and the angular distribution of the illumination light can be narrowed at the same time. As a result, the illumination efficiency can further improved.

Variation 5-4

In all the embodiments described above, each of the light sources is disposed in such a way that the optical axis of the arc tube is parallel to the illumination optical axis L (the optical axis of the illuminator), but the light sources are not necessarily disposed this way. That is, since the light path changer, the integrator, or any other illuminance homogenizing system disposed downstream of the illuminator (on the illuminated object side) can be used to change the light traveling direction, the two light sources may be inclined in such a way that the optical axes of the arc tubes intersect the illumination optical axis L while the two light sources remain symmetric with respect to the illumination optical axis L. Since the two light sources 2 and 3 are spaced apart from each other by the distance S as shown in FIG. 1B, and the space having the distance S is kind of an unnecessary space where no reflector is disposed, the two light sources can be inclined to each other in such a way that the unnecessary space is narrowed and the two light sources do not physically interfere with each other.

Figure 19:
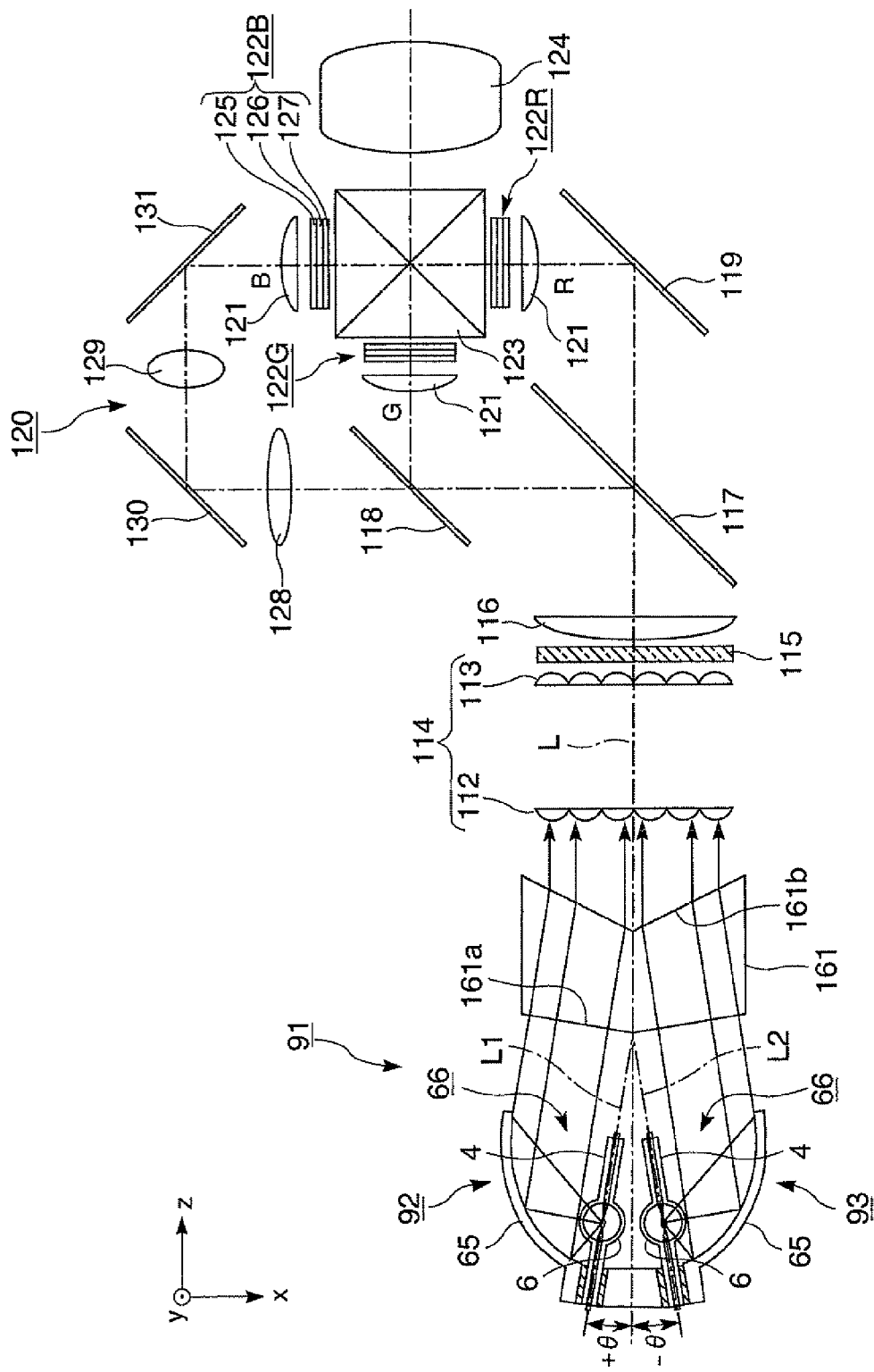
FIG. 19 is a schematic configuration diagram of a projector of Variation 5-4.

For example, in the projector shown in FIG. 19, the lamp optical axis L1 of a first light source 92 and the lamp optical axis L2 of a second light source 93 in an illuminator 91 are inclined to the illumination optical axis L by inclination angles $+\theta$ and $-\theta$, respectively, and the light fluxes that exit from the light sources 92 and 93 travel inward toward the illumination optical axis L. The light fluxes having exited from the light sources 92 and 93 are incident on a light path changing optical device 161 at angles of incidence $(+\theta, -\theta)$, respectively, which are the inclination angles of the lamp optical axes L1 and L2, and the light path changing optical device 161 causes the incident light fluxes to travel in the direction substantially parallel to the illumination optical axis L and exit from the light path changing optical device 161. To this end, the cross-sectional shape of the light path changing optical device 161 in the xz plane in the present variation differs from that of the light path changing optical device 111 in the fifth embodiment in that a light incident-side end surface 161a and a light exiting-side end surface 161b are not parallel to each other. The incident light fluxes from the light sources 92 and 93 are refracted at the light incident-side end surface 161a and/or the light exiting-side end surface 161b so that the light traveling directions are changed. In other words, the inclination of the light incident-side end surface 161a and the light exiting-side end surface 161b of the light path changing optical device 161, or the curvature of the two end surfaces when they are curved, may be set in such a way that the incident light fluxes from the light sources 92 and 93 are converted into light fluxes substantially parallel to the illumination optical axis L and exit from the light path changing optical device 161. Since the behavior of the illumination light having exited from the light path changing optical device 161 is the same as that in the fifth embodiment, no redundant description of the following behavior will be made.

In the configuration described above as well, the illumination light flux having exited from the illuminator 91 can be reduced in diameter with almost no spread in the angular distribution of the light fluxes having exited from the light sources 92 and 93, whereby the resultant illumination light is readily used in the following optical system. Further, since the two light sources 92 and 93 are inclined to the illumination optical axis L in such a way that front openings 66 of main reflectors 65 approach each other to the extent that the two light sources 92 and 93 do not come into physical contact, the illuminator 91 can be further reduced in size and, in particular, the dimension in the direction in which the two light sources 92 and 93 are disposed side by side can be reduced.

While the present variation has been described with reference to the case where a light path changing optical device is used, the same effect as that provided by the light path changing optical device in the present variation can be provided by skillfully modifying the configuration of the integrator, which is an illuminance homogenizing system, or any other suitable component, as described in Variation 5-3. Further, the two light sources can be disposed asymmetrically with respect to the illumination optical axis L by employing a configuration in which the traveling directions of the light fluxes having exited from the two light sources can be independently controlled by the light path changer, the integrator, or any other suitable illuminance homogenizing system. In this case, for example, the shape of the light path changing optical device 111 in the fifth embodiment (FIG. 13A) may be changed to be asymmetric with respect to the illumination optical axis L, and the inclination of the light incident-side end surface 111a and the light exiting-side end surface 111b, or the curvature thereof when they are curved (in the case of Variation 5-2), and the refractive index of the light-transmissive material of the optical device are set as appropriate in accordance with the light fluxes from the light sources 2 and 3 so that light substantially parallel to the illumination optical axis L exits from the light path changing optical device.

The technical extent of the invention is not limited to that shown in the embodiments described above, but a variety of changes can be made to the extent that they do not depart from the spirit of the invention. For example, the shape of the curved surface of each of the main reflectors is assumed to be parabolic in the embodiments described above, but the shape may be instead ellipsoidal or aspheric. When an ellipsoidal shape is used, the light having exited from the illuminator is not parallelized light but convergent light. The illumination light flux can therefore be further reduced in diameter, and the illumination efficiency can be further improved accordingly in the following optical system. Further, since the exiting light is convergent light, the configuration of the light path changing optical system, when disposed downstream of the illuminator, can be simplified; for example, the number of refractive surfaces can be reduced to one.

A lens array configuration using two lens arrays or a rod configuration using a solid rod-shaped or hollow rod-shaped light guide can be used as the illuminance homogenizing system for forming a uniform illuminance distribution on an object to be illuminated and a uniformly polarized light illumination system for forming a uniform illuminance distribution on the object to be illuminated by using specific polarized light. In particular, when each of the main reflectors has an ellipsoidal surface, the light having exited from the illuminator is convergent light, which works well with an optical system having a rod configuration.

In an illuminator according to an aspect of the invention, the orientation in which each of the arc tubes emits light is not limited to a specific one. That is, the direction in which a pair of electrodes and sealing portions of the arc tube extend may be the horizontal direction, the vertical direction, or any other suitable direction. In particular, when they extend in the vertical direction, the front opening of each of the main reflectors can be oriented upward. In this configuration, since the heat generated in the arc tube can be smoothly dissipated into the air, cooling is carried out relatively easily and degradation due to the heat is readily avoided.

While a discharge-type arc tube is used in the embodiments described above, a non-discharge-type arc tube may be used. An example of other arc tubes may be the one in which a pair of electrodes are physically connected to each other with a filament or any other suitable component and conducting a current causes the filament to emit light, such as a tungsten halogen lamp. Further, how to operate the arc tube is not limited to a specific method, but a DC-operated arc tube and an AC-operated arc tube can be used in the invention. Moreover, the light modulator, which is an object to be illuminated, is not limited to a specific one. For example, the invention is applicable to an illuminator that illuminates a transmissive liquid crystal device, a reflective liquid crystal device, a mirror array device using a large number of micro mirrors (DMD device), or any other device. Further, an object to be illuminated is not necessarily a light modulator. In addition to the above, the shapes, arrangements, materials, and other factors of a variety of components presented in the embodiments described above are not limited thereto, but may be changed as appropriate.

The entire disclosure of Japanese Patent Application No. 2008226979, filed Sep. 4, 2008 is expressly incorporated by reference herein.

What is claimed is:

1. An illuminator comprising:
   a first light source and a second light source that are disposed substantially symmetrically with respect to an illumination optical axis;
   a light path changer configured to cause light fluxes having exited from the first and second light sources to translate toward the illumination optical axis, light exiting from the light path changer being parallel to the illumination optical axis; and
   a lens array integrator that receives the light exited from the light path changer,
   wherein each of the first and second light sources includes an arc tube, a first reflector disposed to surround part of the entire space around a lamp optical axis of the arc tube, the first reflector reflecting the light emitted from the arc tube toward an object to be illuminated, and a second reflector disposed on the opposite side of the lamp optical axis of the arc tube to the first reflector, the second reflector reflecting the light emitted from the arc tube toward the first reflector, the first reflector having a shape obtained by halving a reflector that covers the entire space around the lamp optical axis, the first reflector being disposed in such a way that the lamp optical axis coincides with a line of the halving, the illumination optical axis being in the center of the lamp optical axes of the arc tubes in the first and second light sources; and wherein the lamp optical axis of the first light source is substantially parallel to the lamp optical axis of the second light source.

2. The illuminator according to claim 1, wherein each set of the first and second reflectors is disposed in such a way that curved reflection surfaces thereof face each other and at least one of the first and second reflectors is disposed to surround nearly the entire space around the lamp optical axis of the corresponding arc tube.

3. The illuminator according to claim 2, wherein the light receivable angular range of each of the first reflectors around the lamp optical axis of the corresponding arc tube is greater than 180 degrees.

4. The illuminator according to claim 3, wherein the light receivable angular range of each of the second reflectors around the lamp optical axis of the corresponding arc tube is greater than 180 degrees.

5. The illuminator according to claim 1, wherein each of the second reflectors is formed of a reflection layer formed on the surface of the corresponding arc tube.

6. The illuminator according to claim 1, wherein each of the second reflectors is formed of a reflection mirror that is a separate component from the corresponding arc tube and disposed in the vicinity thereof.

7. The illuminator according to claim 1, wherein the first reflector in the first light source and the first reflector in the second light source are integrated with each other.

8. The illuminator according to claim 1, wherein a separation plate is provided between the first light source and the second light source, the separation plate partitioning the space in which the arc tubes of the first and second light sources are disposed.

9. The illuminator according to claim 8, wherein the separation plate is formed of two separation plates, a first separation plate located in the first light source and a second separation plate located in the second light source.

10. The illuminator according to claim 1, wherein a first lead wire connected to the arc tube in the first light source and a second lead wire connected to the arc tube in the second light source are disposed in such a way that the lead wires are spaced apart from each other.

11. The illuminator according to claim 1, further comprising an illuminance homogenizing system for homogenizing the illuminance of the light fluxes having exited from the first and second light sources, the illuminance homogenizing system having a function of causing the light fluxes having exited from the first and second light sources to approach the illumination optical axis.

12. A projector comprising:

the illuminator according to claim 1;

a light modulator that modulates the light from the illuminator; and a projection system that projects the light modulated by the light modulator.

13. The projector according to claim 12, wherein the light modulator has a longer side and a shorter side, and the first and second light sources are disposed side by side along the longer side of the light modulator.

14. The projector according to claim 12, further comprising a color light separation system that separates the light fluxes having exited from the first and second light sources into a plurality of color light fluxes having different wavelength ranges, wherein the first and second light sources are disposed side by side along the direction perpendicular to the direction in which the color light separation system performs color light separation.

* * * * *